United States Patent
Katayama et al.

(10) Patent No.: US 7,802,777 B2
(45) Date of Patent: Sep. 28, 2010

(54) LIQUID-FILLED VIBRATION ISOLATOR

(75) Inventors: Minoru Katayama, Okayama (JP); Naoki Miyamoto, Okayama (JP)

(73) Assignee: Kurashiki Kako Co., Ltd., Okayama (JP)

(*) Notice: Subject to any disclaimer, the term of this patent is extended or adjusted under 35 U.S.C. 154(b) by 0 days.

(21) Appl. No.: 12/487,677

(22) Filed: Jun. 19, 2009

(65) Prior Publication Data

US 2010/0213650 A1 Aug. 26, 2010

(30) Foreign Application Priority Data

Feb. 24, 2009 (JP) ............................... 2009-040619
Feb. 27, 2009 (JP) ............................... 2009-045529
Mar. 4, 2009 (JP) ............................... 2009-050924

(51) Int. Cl.
*F16F 13/00* (2006.01)
(52) U.S. Cl. ................................................ 267/140.13
(58) Field of Classification Search . 267/140.13–141.7; 248/562, 636
See application file for complete search history.

(56) References Cited

U.S. PATENT DOCUMENTS

| | | | |
|---|---|---|---|
| 4,697,793 A | 10/1987 | Reuter et al. | |
| 4,781,362 A | 11/1988 | Reuter et al. | |
| 4,925,162 A | 5/1990 | Kojima | |
| 5,499,799 A | 3/1996 | Kojima | |
| 6,311,963 B1* | 11/2001 | Suzuki et al. | 267/140.13 |
| 6,505,822 B1* | 1/2003 | Yamamoto et al. | 267/140.13 |
| 7,341,243 B2* | 3/2008 | Yamamoto et al. | 267/140.13 |
| 2005/0206056 A1* | 9/2005 | Maeno et al. | 267/140.13 |

FOREIGN PATENT DOCUMENTS

| | | |
|---|---|---|
| EP | 0 440 260 A1 | 8/1991 |
| JP | 08-145111 | 6/1996 |
| JP | 10-132017 | 5/1998 |
| JP | 2001-108008 | 4/2001 |
| JP | 3461913 | 8/2003 |
| JP | 3563309 | 6/2004 |
| JP | 2004-301245 | 10/2004 |
| JP | 2006-112607 | 4/2006 |
| JP | 2009-097688 | 5/2009 |

OTHER PUBLICATIONS

European Search Report for corresponding European Application No. 09008080.5 dated Apr. 27, 2010.

* cited by examiner

*Primary Examiner*—Christopher P Schwartz
(74) *Attorney, Agent, or Firm*—Renner, Otto, Boisselle & Sklar, LLP

(57) ABSTRACT

A liquid-filled vibration isolator has a first orifice channel providing communication between a pressure receiving chamber and a balancing chamber. One of the pressure receiving chamber and the balancing chamber is communicated via a second orifice channel with an intermediate liquid chamber. The second orifice channel has a shorter distance or a larger cross-sectional area than the first orifice channel. An elastic film member, such as a membrane, separates the intermediate liquid chamber and the other of the pressure receiving chamber and the balancing chamber from each other. A communicating hole of a predetermined size is formed in the elastic film member. An imaginary orifice channel combined from the two orifice channels provides a high damping effect on input vibration of relatively low frequency. As the vibration frequency increases, a gradual transition is made to the damping characteristic of the second orifice channel only.

7 Claims, 23 Drawing Sheets

LIQUID-FILLED VIBRATION ISOLATOR

CROSS-REFERENCES TO RELATED APPLICATIONS

This application claims priority under 35 U.S.C. 119 to Japanese Patent Application Nos. 2009-040619, 2009-045529 and 2009-050924, the entire contents of all of which are incorporated herein by reference.

BACKGROUND

This invention relates to liquid-filled vibration isolators for damping vibrations by flow resistance of a liquid enclosed therein and particularly relates to structures of liquid chambers and orifice channels.

An example of well-known vibration isolators of such kind is an engine mount for a motor vehicle. The engine mount has a basic structure in which a first fitting located on the engine side (connected to a supported part) is connected to a second fitting located on the vehicle body side (connected to a supporting part) by a rubber elastic material, a plurality of liquid chambers are formed to change their volumes with deformation of the rubber elastic material and the liquid chambers are communicated with each other by an orifice channel. By using resonance of the liquid flowing via the orifice channel between the liquid chambers, engine vibrations in a predetermined frequency range can be effectively absorbed and/or damped.

Generally, because of use of vehicle engines over wide operating range, engine mounts are desired to provide a vibration isolation effect on input vibrations of different frequencies and amplitudes. However, the frequency of vibration effectively absorbed or damped by liquid flow via the orifice channel as described above is almost determined by the cross-sectional area or length of the orifice channel. Therefore, a sufficient vibration isolation effect on few kinds of input vibrations cannot be obtained by a single orifice channel.

To cope with this, for example, Patent Documents 1 and 2 disclose techniques in which two orifice channels of different cross-sectional areas or different lengths are provided to tune them to different frequency ranges. Specifically, a vibration isolator disclosed in Patent Document 1 includes: a main liquid chamber; a first sub liquid chamber separated from the main liquid chamber by a partition member; and a second sub liquid chamber formed on the main liquid chamber side of the partition member. Furthermore, a first orifice channel providing communication between the main liquid chamber and the first sub liquid chamber is tuned, for example, to engine shake at a frequency below 15 Hz, while a second orifice channel providing communication between the first and second sub liquid chambers is tuned, for example, to engine-idle vibration at a frequency of 20 to 40 Hz.

In addition, when the vibration isolator inputs vibration at a frequency over 40 Hz, an elastic film member (membrane) separating the main liquid chamber from the second sub liquid chamber deforms to absorb variations in the liquid pressure of the main liquid chamber. Thus, booming noise in the passenger compartment can be reduced.

In a liquid-filled vibration isolator disclosed in Patent Document 2, unlike that in Patent Document 1, the second sub liquid chamber is formed on the first sub liquid chamber side of a partition member separating the main liquid chamber from the first sub liquid chamber. A second diaphragm made of rubber separates the second sub liquid chamber from the first sub liquid chamber. Furthermore, a first orifice channel providing communication between the main liquid chamber and the first sub liquid chamber is tuned to engine shake at a frequency of approximately 10 Hz, while a second orifice channel providing communication between the main liquid chamber and the second sub liquid chamber is tuned to engine-idle vibration at a frequency of approximately 20 to 30 Hz.

Patent Document 1: Japanese Patent No. 3461913
Patent Document 2: Japanese Patent No. 3563309

SUMMARY

In order to further improve vehicle ride, there is recent demand to give an engine mount an enhanced damping effect on vibrations in a higher frequency range than engine shake. For this purpose, it is conceivable to shift the tuning of the first orifice channel to higher frequencies. However, this is merely to change the frequency range in which the engine mount exhibits a high damping effect, and instead lowers the damping effect on engine shake, which is not effective.

Alternatively, it is also conceivable to provide the engine mount with a third orifice channel having an intermediate characteristic between those of the first and second orifice channels. In this case, however, liquid resonance in the third orifice channel may cause a sharp rise of the dynamic stiffness of rubber in a frequency range of engine-idle vibration (a so-called jump of the dynamic stiffness). In the first place, it does not seem very realistic to form three sub liquid chambers and three orifice channels in a limited space of the engine mount.

The present invention has been made in view of the foregoing points and, therefore, an object thereof is to provide a liquid-filled vibration isolator that is suitable as a vehicle engine mount or the like and gives a high damping effect over a wide frequency range like never before.

To attain the above object, a liquid-filled vibration isolator includes first and second orifice channels and is configured to provide a damping effect over a wide frequency range not by simple switching between the two orifice channels according to the frequency of input vibration but by the later-described interaction between them.

Specifically, a first aspect of the invention is directed to a liquid-filled vibration isolator including a first fitting connected to a supported part, a second fitting connected to a supporting part and through a rubber elastic material to the first fitting, a main liquid chamber formed between both the first and second fittings to change the volume thereof with deformation of the rubber elastic material, and a first sub liquid chamber communicated via a first orifice channel with the main liquid chamber.

The vibration isolator further includes a second sub liquid chamber communicated via a second orifice channel with one of the main liquid chamber and the first sub liquid chamber, like the above conventional techniques (Patent Documents 1 and 2). The second orifice channel has at least one of a shorter distance and a larger cross-sectional area than the first orifice channel. The vibration isolator further includes an elastic film member separating the second sub liquid chamber from the other of the main liquid chamber and the first sub liquid chamber. The elastic film member has a communicating hole of a predetermined size formed to provide communication between the other chamber and the second sub liquid chamber.

When the vibration isolator having the above structure inputs relatively low-frequency vibration, the rubber elastic material deforms and the volume of the main liquid chamber periodically changes. Thus, the liquid flows via the first orifice channel between the main liquid chamber and the first sub liquid chamber and also flows via the second orifice channel and the second sub liquid chamber between the main liquid chamber and the first sub liquid chamber. This is because the rate of liquid flow caused by input low-frequency vibration is relatively low. In this case, two liquid chambers separated from each other by the elastic film member are substantially communicated with each other via the communicating hole.

The above state can be assumed to be that the main liquid chamber and the first sub liquid chamber are communicated with each other via a single imaginary orifice channel combined from the first and second orifice channels. Owing to liquid resonance in the imaginary orifice channel, as shown in the imaginary curve in FIG. 4, a higher peak of the damping effect than individual peaks (see the dot-dash curve in FIG. 4) of those of the first and second orifice channels appears in an intermediate frequency range between both the individual peaks.

In other words, although the original damping effect of the first orifice channel is not provided in the vicinity of the resonance frequency of the first orifice channel, a high damping effect is obtained over a wide frequency range from the resonance frequency of the first orifice channel to higher frequencies. However, as the frequency becomes higher, the liquid gradually becomes less likely to flow through the first orifice channel (more likely to cause so-called clogging). Thus, the damping effect of the imaginary orifice channel gradually wears off and the damping effect due to liquid resonance in the second orifice channel becomes more dominant.

Since in this manner a gradual transition is made from the damping effect of the imaginary orifice channel combined from the first and second orifice channels to the damping effect of the second orifice channel alone according to the frequency of input vibration, the vibration isolator of this aspect of the invention provides, as shown in the solid and broken curves in FIG. 4, a high damping effect, which would conventionally be provided only in the vicinities of the resonance frequencies of the orifice channels, over a wide frequency range from the vicinity of the resonance frequency of the first orifice channel to the vicinity of the resonance frequency of the second orifice channel.

Therefore, in applying the vibration isolator of this aspect of the invention to an engine mount for a motor vehicle, if the first orifice channel is tuned to a lower frequency range than the frequency of engine shake, for example, 5 Hz and near 5 Hz, and the second orifice channel is tuned to a frequency range of engine-idle vibration as conventionally done, a sufficient vibration damping effect can be obtained over a wide frequency range covering from engine shake to engine-idle vibration.

In addition, since thus the orifice channels function over a wide frequency range, a so-called jump of the dynamic stiffness does not occur in this frequency range. Therefore, while engine shake and engine-idle vibration can be absorbed or damped more then ever before, vibrations in an intermediate frequency range between them can be effectively absorbed or damped, whereby the vehicle ride can be improved.

Preferably, the liquid-filled vibration isolator further includes a movable plate disposed in a partition wall between the one liquid chamber and the second sub liquid chamber, the movable plate being configured to move according to the liquid pressures in both the one liquid chamber and the second sub liquid chamber and absorb variations in the liquid pressures (a second aspect of the invention). Thus, variations in the liquid pressures in the second sub liquid chamber and one of the main liquid chamber and the first sub liquid chamber are absorbed by movement of the movable plate. This eliminates a jump of the dynamic stiffness independently of frequency upon input of vibration with a relatively small amplitude.

The second orifice channel may provide communication between the main liquid chamber and the second sub liquid chamber or may provide communication between the first and second sub liquid chambers (third and fourth aspects of the invention). However, if the second orifice channel provides communication between the main liquid chamber and the second sub liquid chamber and the elastic film member separates the first and second sub liquid chambers from each other, this effectively prevents cavitation and is therefore preferable.

The reason for this is that if the main liquid chamber and the second sub liquid chamber were separated from each other by the elastic film member, the liquid flowing via the communicating hole in the elastic film member between the main and second sub liquid chambers would cause a strong turbulence, which might produce air bubbles in the main liquid chamber in the vicinity of the communicating hole.

More preferably, the liquid-filled vibration isolator further includes a partition member separating the main liquid chamber from the first sub liquid chamber, wherein the partition member has the first and second orifice channels and a recess opening to the first sub liquid chamber. Furthermore, the opening of the recess is covered with the elastic film member to form the second sub liquid chamber (a fifth aspect of the invention).

If in this manner the first and second orifice channels and the second sub liquid chamber are formed in the partition member, this simplifies the structure of the vibration isolator. In addition, in this case, the bottom wall of the recess serves as a partition wall separating the main liquid chamber from the second sub liquid chamber. Therefore, the above movable plate can be disposed in the partition wall.

More specifically, in the vibration isolator in which one of the first and second fittings has a columnar shape extending in a direction of input of main load and the other fitting has a cylindrical shape spaced outwardly away from the one fitting, the partition member is fitted in the inner periphery of the other fitting to separate the main liquid chamber and the first sub liquid chamber from each other on opposite sides of the partition member in the direction of input of main load. Furthermore, the communicating hole is formed approximately at the center of the elastic film member covering the opening of the recess in the partition member (a sixth aspect of the invention).

With the above structure, it is ensured that the elastic film member has a relatively large area. In addition, the cross-sectional area of the communicating hole formed approximately at the center of the elastic film member does not change very much even if the elastic film member deforms owing to variations in the liquid pressures. Therefore, the above structure is advantageous in stably providing the above effects.

As seen from the above, the cross-sectional area of the communicating hole has a significant effect on how the above-described damping effect specific to the vibration isolator appears. Specifically, as the cross-sectional area of the communicating hole is larger, the vibration isolator exhibits a damping characteristic closer to that of the imaginary orifice channel, while as the cross-sectional area thereof is smaller, the vibration isolator exhibits a damping characteristic closer to those of the first and second orifice channels. Results of experiments made by the inventor showed that, in order to provide the above-described effects, if the elastic film member has a thickness of approximately 1.0 to 5.0 mm, the communicating hole preferably has a diameter of approximately 2.0 to 10.0 mm and more preferably has a diameter of approximately 3.0 to 6.0 mm (a seventh aspect of the invention).

EFFECTS

As described so far, according to the above liquid-filled vibration isolator, when the vibration isolator inputs relatively low-frequency vibration, a damping effect of an imaginary orifice channel combined from the first and second orifice channel can be provided by the interaction between the first and second orifice channels. Furthermore, as the frequency of input vibration increases, a gradual transition is made to the damping effect of the second orifice channel alone. Therefore, a sufficient damping effect can be obtained over a wide frequency range like never before.

Hence, if the vibration isolator is used as an engine mount for a motor vehicle, vibrations from the engine and the like can be effectively absorbed or damped over a wide frequency range from engine shake to engine-idle vibration, which significantly improves the vehicle ride.

DETAILED DESCRIPTION

Embodiments will be explained below in detail with reference to the drawings. Note that the following description of the embodiments is merely illustrative in nature and is not intended to limit the scope, applications and use of the invention.

Embodiment 1

Figure 1:
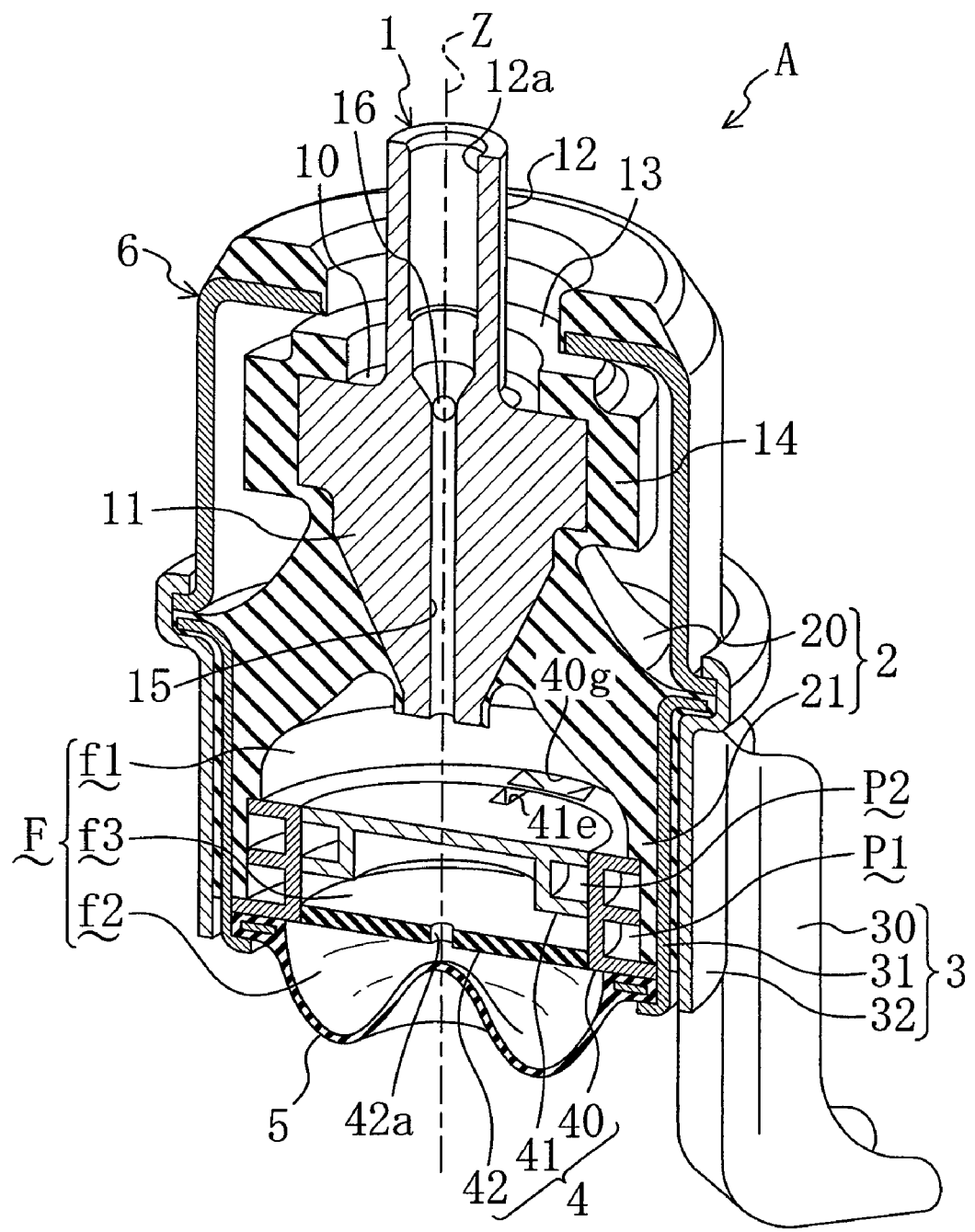
FIG. 1 is a perspective view of the structure of an engine mount according to Embodiment 1, partly showing in cross section.

FIG. 1 shows a liquid-filled vibration isolator according to an embodiment that is applied to an engine mount A for a motor vehicle. The engine mount A is interposed between an unshown vehicle engine, an unshown transmission (both of which are collectively termed a power plant), and an unshown vehicle body, bears static loads of them and absorbs or damps vibrations from the power plant to restrain the vibrations from being transmitted to the vehicle body.

The engine mount A of Embodiment 1 includes: an approximately columnar inner fitting 1 (first fitting) to be mounted on the power plant through an unshown bracket or the like; and a cylindrical outer fitting 3 (second fitting) supporting the inner fitting 1 through a rubber elastic material 2 from below. The engine mount A is fixed, such as to a side frame of the vehicle body, by a pair of legs 30 (only one leg shown in FIG. 1) welded to front and rear portions of a lower part of the outer periphery of the outer fitting 3.

The inner fitting 1 includes a thick collar 10 at an intermediate part thereof in a direction of the axis Z of the columnar shape, a downward tapered part 11 formed below the collar 10, and a stem 12 formed above the collar 10. Furthermore, in the example shown in FIG. 1, rubber stopper layers 13 and 14 are provided on the top surface and the outer periphery, respectively, of the collar 10 to cooperatively act with the later-described stopper fitting 6. The stem 12 is configured to be fitted with a bracket mounted on the power plant and has a bolt hole 12a extending in the direction of the axis Z. The bolt hole 12a is configured to have threaded engagement with a bolt for fastening the bracket.

In the example of FIG. 1, the axis Z extends in a direction of input of the static load of the power plant (a direction of input of main load). The inner fitting 1 has a longitudinal bore 15 extending along the axis Z downward from the lower end of the bolt hole 12a. The longitudinal bore 15 opens at the lower end of the inner fitting 1 and is used to fill the later-described liquid chamber F therethrough with a liquid. After the filling of the liquid, the longitudinal bore 15 is sealed with a steel ball 16.

The rubber elastic material 2 includes an umbrella-shaped main spring part 20 splaying out radially downward from the surface of the tapered part 11 of the inner fitting 1, and a cylindrical extension 21 continued to and extending downward from the lower end of the main spring part 20. The main spring part 20 is bonded at an upper part thereof on the tapered part 11 by vulcanization to cover the tapered part 11. The rubber elastic material 2 is connected at the extension 21 to the inner periphery of the outer fitting 3. Specifically, in the example of FIG. 1, the outer fitting 3 has a double-wall structure composed of an inner cylinder 31 and an outer cylinder 32. The inner cylinder 31 is integrated with the rubber elastic material 2 by embedding it into the extension 21 of the rubber elastic material 2, and the outer periphery of the extension 21 is fixed to the inner periphery of the outer cylinder 32 by adhesion.

Furthermore, the inner periphery of the extension 21 of the rubber elastic material 2 is expanded in diameter at a lower part thereof to form an annular shoulder. An orifice disk 4 is fitted in the inner periphery of the extension 21 from below with the shoulder as an abutment. A rubber diaphragm 5 is attached to the orifice disk 4 to cover it from below. The diaphragm 5 includes a reinforcement fitting embedded in an outer peripheral part thereof. The outer peripheral part of the diaphragm 5 is clamped against the orifice disk 4 from below by a flange formed at the lower end of the inner cylinder 31 of the outer fitting 3.

The diaphragm 5 closes the bottom opening of the outer fitting 3 to form a liquid chamber F. The liquid chamber F is partitioned into upper and lower parts by the orifice disk 4 (partition member). The upper part thereof, i.e., one of the two parts separated from each other on opposite sides of the orifice disk 4 in the direction of input of main load, constitutes a pressure receiving chamber f1 (main liquid chamber), while the lower part thereof constitutes a balancing chamber f2 (first sub liquid chamber). In the example of the figure, the orifice disk 4, although described in detail later, includes a first orifice channel P1 of vertical two-story structure formed in the outer periphery thereof to provide communication between the pressure receiving chamber f1 and the balancing chamber f2.

An intermediate liquid chamber f3 (second sub liquid chamber) is formed on the inner peripheral side of the orifice disk 4 and separated from the balancing chamber f2 by a membrane 42 (elastic film member). The orifice disk 4 further includes an annular second orifice channel P2 formed in an inner peripheral part thereof to surround the intermediate liquid chamber f3 and provides communication between the intermediate liquid chamber f3 and the pressure receiving chamber f1. Thus, the liquid flows via the first and second orifice channels P1 and P2 between the pressure receiving chamber f1, the balancing chamber f2 and the intermediate liquid chamber f3, thereby effectively absorbing or damping vibrations from the power train.

Disposed at an upper part of the engine mount A is an inverted cup-shaped stopper fitting 6 that covers the main spring part 20 of the rubber elastic material 2. The lower end of the stopper fitting 6 is secured to the upper end of the outer fitting 3 by crimping engagement. The peripheral wall of the stopper fitting 6 constitutes a stopper mechanism in the front-to-rear direction of the vehicle, together with and in cooperation with the rubber stopper layer 14 on the collar 10 of the inner fitting 1. Likewise, the top wall of the stopper fitting 6 constitutes a stopper mechanism in the vertical direction, together with and in cooperation with the rubber stopper layer 13.

FIG. 1 shows the engine mount A in a state in which the static load of the power plant does not act at all on the engine mount A. Therefore, in this state, the clearance between the rubber stopper layer 13 and the top wall of the stopper fitting 6 is small. However, when the engine mount A is mounted on the vehicle to support the power plant so that a static load of 1 G of the power plant is applied thereto, the rubber elastic material 2 bows to displace the inner fitting 1 downward, whereby the above clearance becomes large.

Structure of Orifice Disk

Next, the structure of the orifice disk 4 will be described in detail. As shown in enlarged view in FIG. 2, the orifice disk 4 in this embodiment is formed by assembling a torus-shaped outer member 40 to be fitted into the outer fitting 3 and an inner member 41 to be fitted into the outer member 40, and has the general shape of a thick circular disk. The orifice disk main body thus assembled has a recess opening to the balancing chamber f2 located below. The lower end opening of the recess is covered with the membrane 42 to form the intermediate liquid chamber f3.

Figure 2:
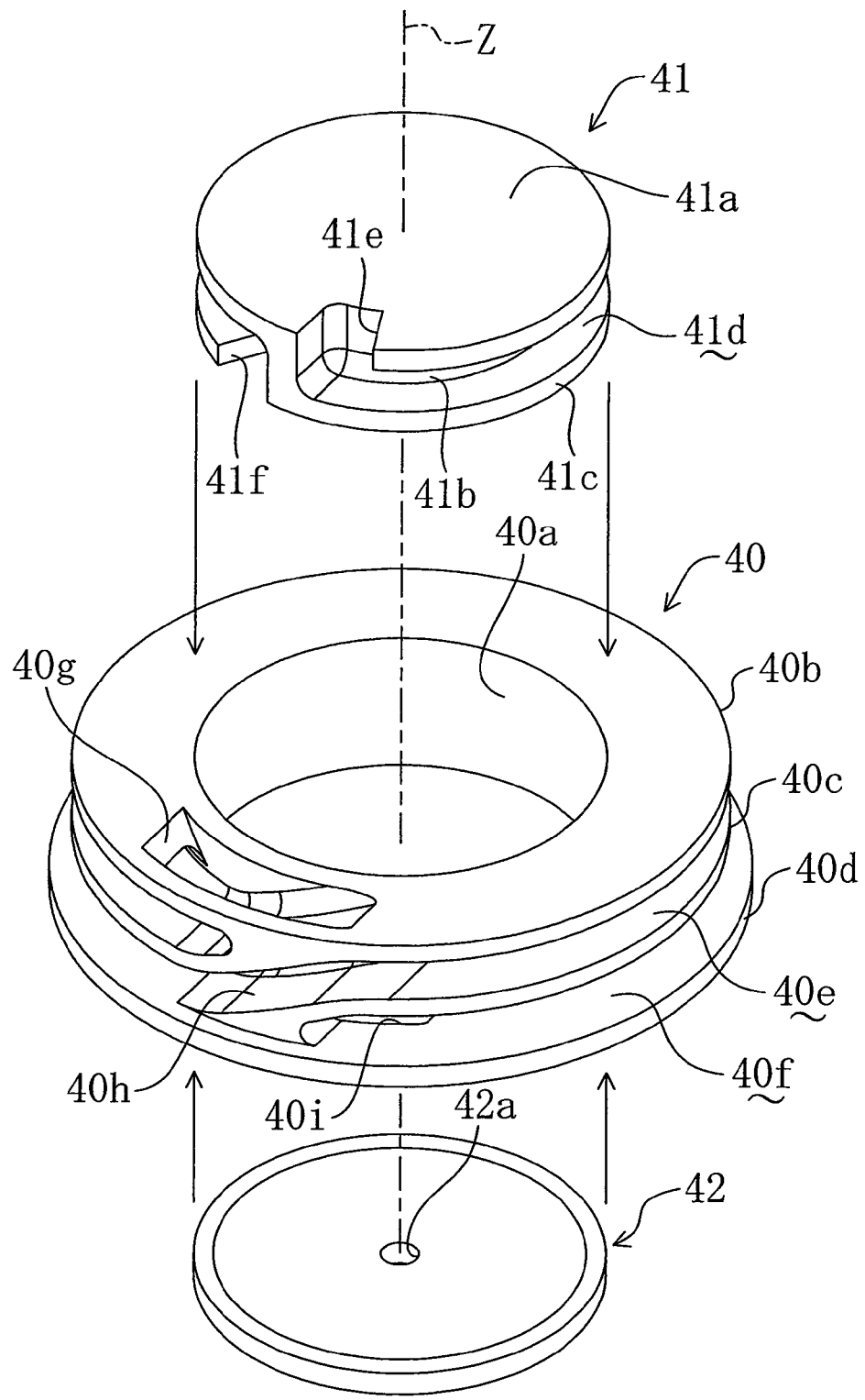
FIG. 2 is an exploded perspective view of the structure of an orifice disk in Embodiment 1.

The outer member 40 is made of, for example, metal (or may be made of resin) and formed so that flanges 40b to 40d extend from the top end, an intermediate part and the bottom end of the outer periphery of a cylindrical body 40a thereof to form vertical two-story, outwardly opening, annular grooves 40e and 40f between the flanges 40b to 40d. Furthermore, one end of the upper annular groove 40e, which is at a frontal point on the circumference in FIG. 2, is communicated with a slot 40g passing through the flange 40b. On the other hand, the other end of the annular groove 40e is communicated through a sloping groove 40h with one end of the lower annular groove 40f. The other end of the lower annular groove 40f is communicated with a narrow slot 40i passing through a portion of the flange 40d near to the inner peripheral edge thereof.

The inner member 41 of the orifice disk 4 includes an approximately disk-shaped top plate 41a, and a cylindrical wall 41b formed on the bottom surface of the top plate 41a and having a smaller diameter than the top plate 41a. Formed inward of the cylindrical wall 41b is a downwardly opening recess of circular cross section. The inner member 41 further includes a flange 41c extending from the lower end of the outer periphery of the cylindrical wall 41b. Thus, an annular groove 41d is formed between the flange 41c and a portion of the top plate 41a near to the outer peripheral edge thereof to open outward approximately over the entire circumference. One end of the annular groove 41d is communicated with a cutaway 41e formed in the top plate 41a at a point on the peripheral edge, i.e., a frontal point in FIG. 2, and opens upward. The other end of the annular groove 41d is communicated with a cutaway 41f likewise formed in the flange 41c, and opens downward.

As shown in FIG. 2, the inner member 41 is first fitted and assembled into the outer member 40 from above so that the top surface of the top plate 41a of the inner member 41 is substantially flush with the top surface of the flange 40b at the top end of the outer member 40. Then, the assembled first and second members 41 and 42 are fitted into the outer fitting 3.

Thus, the openings of the annular grooves 40e and 40f of the outer member 40 are covered with the extension 21 of the rubber elastic material 2 as shown in FIG. 1 to form the helical first orifice channel P1 of vertical two-story structure.

The upper end of the first orifice channel P1 thus formed opens on the top surface of the flange 40b of the outer member 40 towards the pressure receiving chamber f1 (through the slot 40g shown also in FIG. 1). On the other hand, the lower end of the first orifice channel P1 opens at a portion of the bottom surface of the flange 40d near to the inner peripheral edge thereof towards the balancing chamber f2 (through the slot 40i). The first orifice channel P1 turns twice around the outer periphery of the orifice disk 4 and, therefore, has a fairly long distance. Hence, when the liquid flows via the first orifice channel P1 between the pressure receiving chamber f1 and the balancing chamber f2, liquid resonance generates with a very low first set frequency (for example, approximately 5 Hz).

Likewise, the upper end of the second orifice channel P2 of the inner member 41 opens on the top surface of the top plate 41a of the inner member 41 towards the pressure receiving chamber f1 (through the cutaway 41e shown also in FIG. 1). On the other hand, the lower end of the second orifice channel P2 opens on the bottom surface of the flange 41c towards the intermediate liquid chamber f3 (through the cutaway 41f). The second orifice channel P2 has a shorter distance than the first orifice channel P1. Therefore, when the liquid flows via the second orifice channel P2 between the pressure receiving chamber f1 and the intermediate liquid chamber f3, liquid resonance generates with a higher second set frequency (for example, approximately 20 to 25 Hz) than the first set frequency.

To sum up, the engine mount A of this embodiment is fundamentally of a double-orifice type including two orifice channels, first and second orifice channels P1 and P2. One of the two is tuned to a relatively low frequency range, while the other is tuned to a relatively high frequency range. In addition, the membrane 42 separating the balancing chamber f2 and the intermediate liquid chamber f3 from each other has a communicating hole 42a of a predetermined size. Thus, both the chambers f2 and f3 are substantially communicated with each other in a frequency range in which the flow rate of the liquid is relatively low.

Specifically, the membrane 42 is made of a rubber material, such as NR, NR/BR, IIR or silicone rubber, formed into a disk having a diameter of approximately 30 to 60 mm (but not limited to this) and a thickness of approximately 1.5 to 3.0 mm (but not limited to this) and has a rubber hardness of approximately 40 to 80 degrees (JIS K 6253A). The outer peripheral edge of the membrane 42 is joined, such as by adhesion, to the peripheral edge of the lower end opening of the recess in the orifice disk main body (composed of the outer and inner members 40 and 41). Preferably, the membrane 42 has a communicating hole 42a of circular cross section formed to pass through approximately the center thereof. The communicating hole 42a has a diameter of approximately 4.0 mm, for example.

Although described in detail later, as the size of the communicating hole 42a is larger or the rubber hardness of the membrane 42 is higher, the liquid is more likely to flow through the communicating hole 42a. Furthermore, as the size of the membrane 42 itself is larger, the size (cross-sectional area) of the communicating hole 42a is less likely to change very much when the membrane 42 is elastically deformed by a variation in liquid pressure in the balancing chamber f2 or the intermediate liquid chamber f3. Therefore, the state of liquid flowing through the communicating hole 42a is more stabilized. It is also advantageous to this to form the communicating hole 42a at approximately the center of the membrane 42.

Damping Effects of First and Second Orifice Channels

Figure 3:
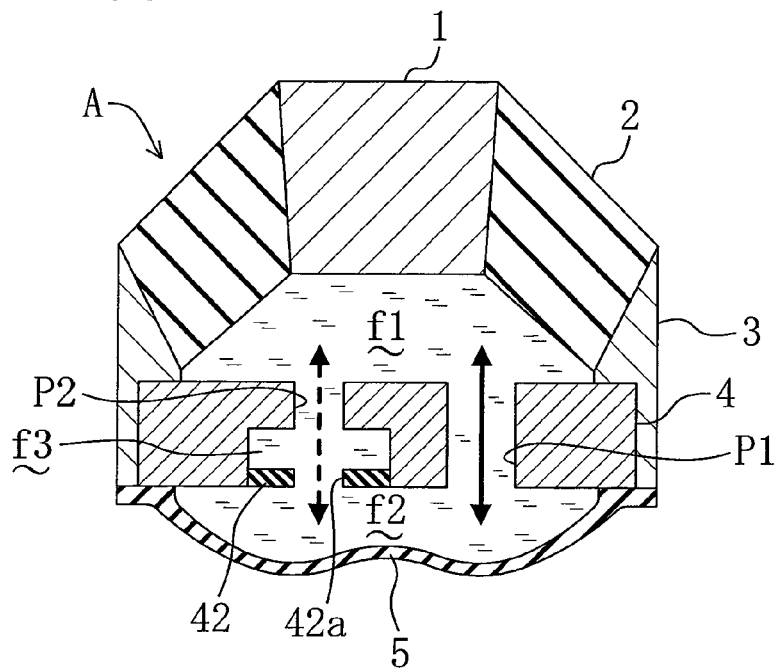
FIG. 3 is a schematic view illustrating the interaction of orifice channels.

The damping effects of the first and second orifice channels P1 and P2 having the above structures will be described below in detail. Referring first to FIG. 3 schematically showing the structure of the engine mount A, the pressure receiving chamber f1 is communicated via the first and second orifice channels P1 and P2 with the balancing chamber f2 and the intermediate liquid chamber f3, respectively. The membrane 42 between the balancing and intermediate liquid chambers f2 and f3 has the communicating hole 42a. The first orifice channel P1 is tuned to a lower frequency than that of engine shake, for example, approximately 5 Hz, while the second orifice channel P2 is tuned to a frequency of, for example, approximately 20 to 25 Hz, according to engine-idle vibration.

If the membrane 42 had no communicating hole 42a, the engine mount A would have the same structure as that of a common double-orifice type. In this case, the engine amount A has, as shown in the dot-dash curve in FIG. 4, a frequency characteristic of the damping effect (hereinafter referred to simply as a damping characteristic) in which two individual damping peaks simply appear in the vicinities of resonance frequencies (5 and 23 Hz in the example of FIG. 4) based on respective liquid resonances in the two orifice channels P1 and P2.

On the other hand, if no membrane 42 were provided, the pressure receiving chamber f1 and the balancing chamber f2 could be assumed to be communicated with each other via a single imaginary orifice channel combined from the first and second orifice channels P1 and P2. The imaginary orifice channel has a damping characteristic due to liquid resonance as shown in the imaginary curve (dash-double-dot curve) in FIG. 4, in which, in a frequency range (approximately 15 to 20 Hz in the figure) intermediate the damping peaks due to the first and second orifice channels P1 and P2, a higher damping peak than them appears.

Figure 4:
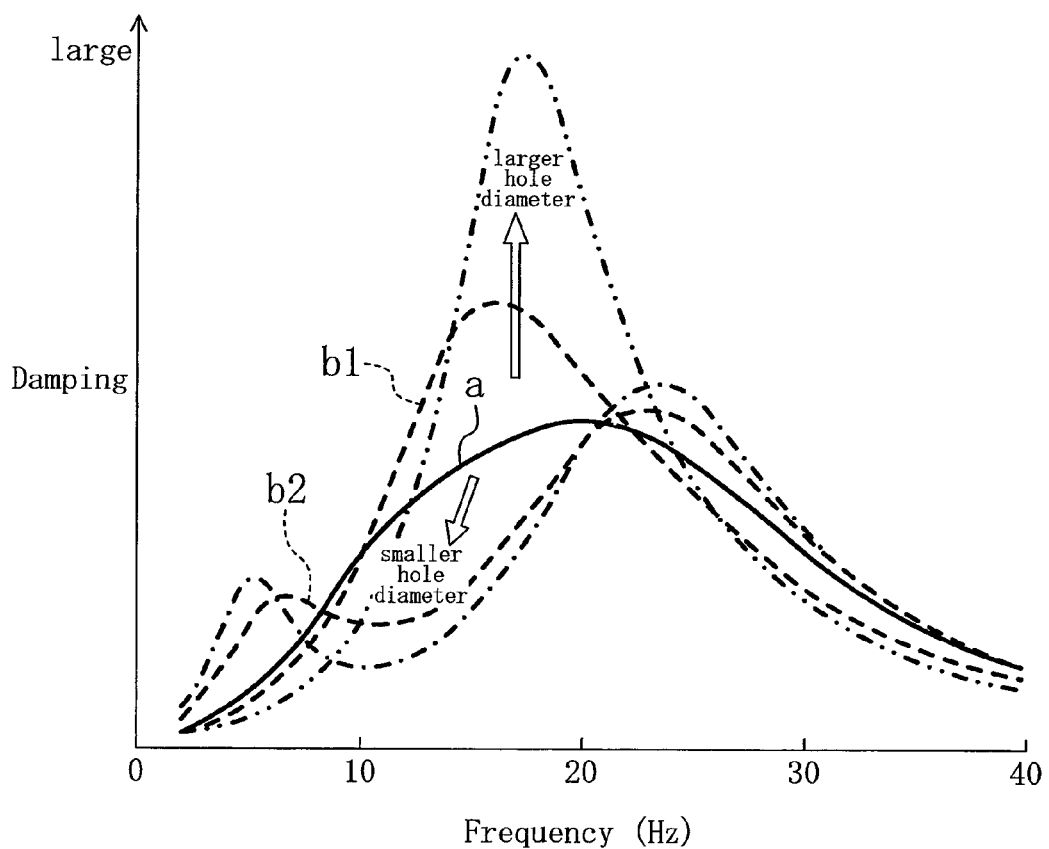
FIG. 4 is a graph showing changes in damping characteristics using membranes having communicating holes of different sizes.

In contrast, if as in this embodiment the membrane 42 has a communicating hole 42a, the engine mount A exhibits, as shown in the solid or broken curve in FIG. 4, a damping characteristic as synthesized from the above two characteristics and has an intermediate damping characteristic between them according to the size (cross-sectional area) of the communicating hole 42a. Specifically, the solid curve a in FIG. 4 shows the case where, like this embodiment, the communicating hole 42a has a diameter of 4.0 mm, the broken curve b1 shows the case of a 6.0 mm-diameter communicating hole 42a, and the broken curve b2 shows the case of a 2.5 mm-diameter communicating hole 42a.

The graph shows a general tendency that as the diameter of the communicating hole 42a is smaller, the damping characteristic is closer to that of the double-orifice type mount, while as the diameter is larger, the damping characteristic is closer to that of the above imaginary orifice channel. Furthermore, comparison between the curves a and b1 shows that as the hole diameter increases, the damping effect at low frequencies (10 to 20 Hz in the example of the figure) increases, whereas the damping effect at high frequencies (over 20 Hz) decreases.

To be more specific, when the engine mount A having a damping characteristic shown in the curve a or b1 in FIG. 4 inputs vibration at a relatively low frequency below approximately 15 Hz, the volume of the pressure receiving chamber f1 periodically changes. Thus, as shown in the solid arrows in FIG. 3, the liquid flows between the pressure receiving chamber f1 and the balancing chamber f2 not only via the first orifice channel P1 but also via the second orifice channel P2 and the intermediate liquid chamber f3. In other words, the rate of liquid flow caused by input low-frequency vibration is relatively low and, therefore, the liquid flows through the communicating hole 42a without significant hindrance so that the balancing chamber f2 and the intermediate liquid chamber f3 are substantially communicated with each other.

In this state, the liquid flows also via the shorter second orifice channel P2. Therefore, the damping effect due to liquid resonance in the first orifice channel P1 lowers but a high damping effect due to the above imaginary orifice channel can be provided in a frequency range from the resonance frequency of the first orifice channel P1 to higher frequencies. Furthermore, the damping effect enhances with increasing frequency. The solid curve a in FIG. 4 shows that the damping effect enhances with increasing frequency up to approximately 20 Hz. The broken curve b1 in FIG. 4 shows that the damping effect enhances with increasing frequency up to approximately 15 Hz.

However, as the frequency of the input vibration becomes higher, the liquid gradually becomes less likely to flow through the first orifice channel P1 (more likely to cause so-called clogging) and gradually becomes less likely to flow through the communicating hole 42a in the membrane 42. Therefore, the high damping effect of the imaginary orifice channel gradually wears off from approximately 10 Hz in the solid curve a and from approximately 13 Hz in the broken curve b1, and the curves a and b1 gradually bend away from the imaginary curve.

Furthermore, in the example of the figure, the communicating hole 42a in the membrane 42 becomes substantially closed in a relatively high frequency range over 20 Hz, whereby the liquid mainly flows via the second orifice channel P2 only between the pressure receiving chamber f1 and the intermediate liquid chamber f3. For this reason, the damping effect (shown in the dot-dash curve) of the second orifice channel P2 can be believed to be dominant in this frequency range.

Moreover, in the example of the figure, both of the curves a and b1 exhibit lower damping effects than the dot-dash curve in the frequency range over 20 Hz and the broken curve b1 in the case of a larger communicating hole 42a exhibits a particularly lower damping effect. This is because the liquid flow via the communicating hole 42a is not fully lost even in a relatively high frequency range and, therefore, the damping effect of the second orifice channel P2 lowers.

Effects of Embodiment Mount

According to the engine mount A (vibration isolator) of this embodiment, when the frequency of input vibration is relatively low, the interaction between the first and second orifice channels P1 and P2 provides a high damping effect due to liquid resonance in the single imaginary orifice channel. As the vibration frequency increases, a gradual transition is made to the damping effect of the second orifice channel P2 alone. Hence, a high damping effect can be obtained over a wide frequency range like never before.

Therefore, if as in this embodiment the first orifice channel P1 is tuned to a predetermined frequency (for example, 5 Hz) lower than the frequency of so-called engine shake and the second orifice channel P2 is tuned to approximately 20 to 25 Hz according to engine-idle vibration, a sufficient vibration damping effect can be obtained over a wide frequency range covering from engine shake to engine-idle vibration.

In addition, since thus the first and second orifice channels P1 and P2 function over such a wide frequency range, a so-called jump of the dynamic stiffness does not occur in this frequency range. As a result, while engine shake and engine-idle vibration can be absorbed or damped more then ever before, vibrations in an intermediate frequency range between them can be effectively absorbed or damped, whereby the vehicle ride can be improved.

Figure 5A:
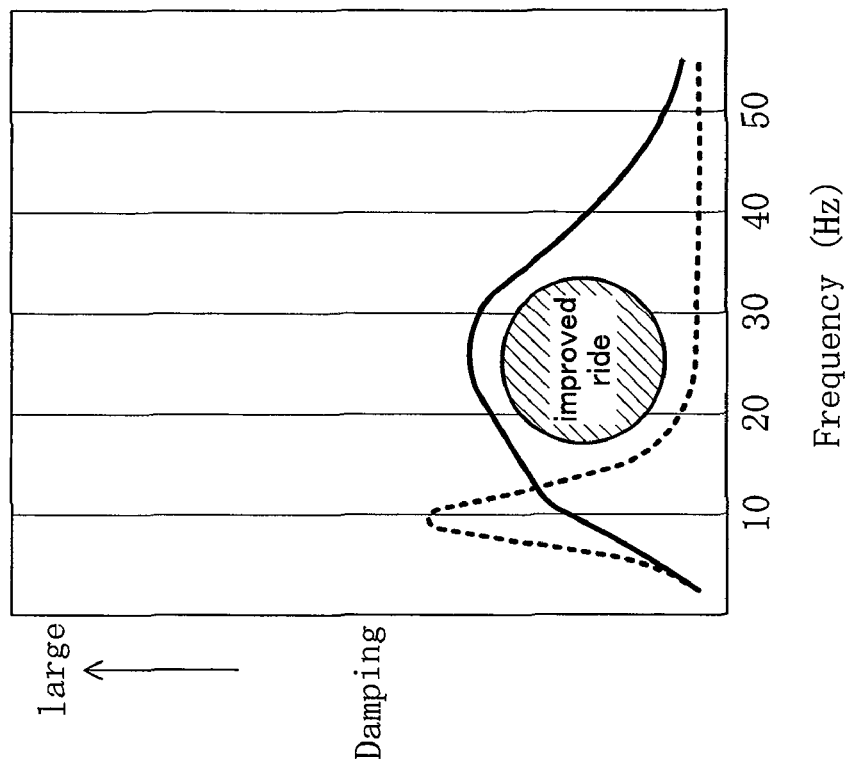
FIG. 5A is a graph showing a dynamic stiffness characteristic when the amplitude of input vibration is relatively large.
Figure 5B:
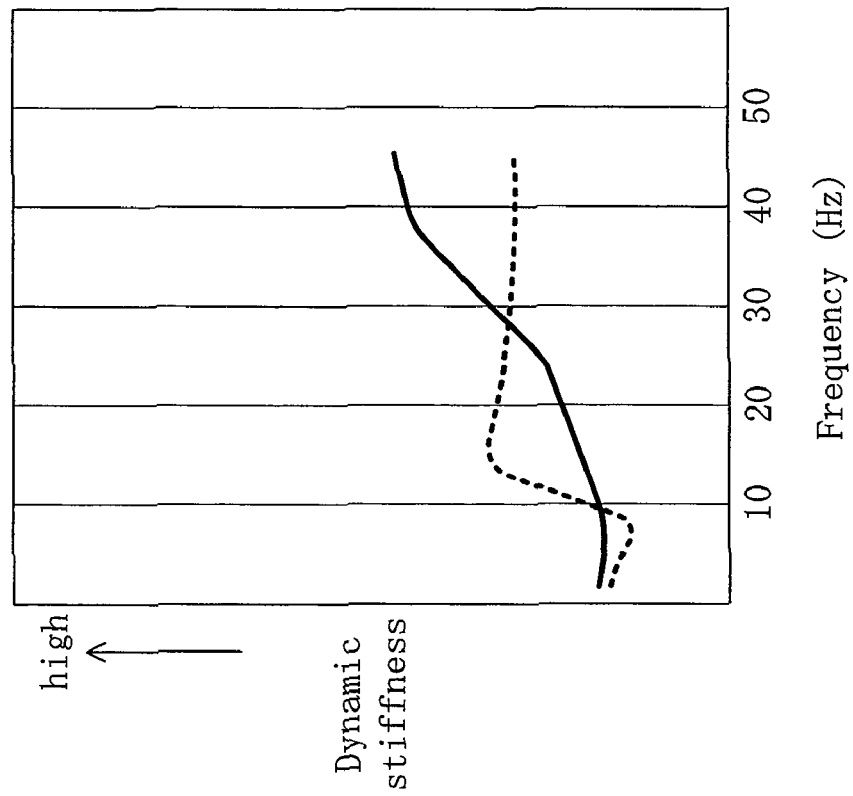
FIG. 5B is a graph showing a damping characteristic when the amplitude of input vibration is relatively large.

Specifically, FIGS. 5A and 5B show examination results of the dynamic stiffness and damping characteristics of the engine mount A in comparison with a conventional, common single-orifice liquid-filled engine mount when relatively large-amplitude vibration correlated with the vehicle ride, such as engine shake, is input (in the example of the figure, a preload of 963 N is applied to the mount A and vibration is applied thereto with an amplitude of ±0.5 mm).

The solid curve in FIG. 5B is the same as, but different in scale from, the solid curve a in FIG. 4. Reference to FIG. 5B shows that the engine mount A exhibits a slightly lower damping effect in a frequency range of so-called engine shake (10 Hz and near 10 Hz) than the conventional liquid-filled mount shown in the broken curve but ensures a necessary damping effect and provides a high damping effect over a wide frequency range from 10 Hz to approximately 30 to 40 Hz. Thus, not only engine shake but also vehicle vibrations due to pitching and the like can be sufficiently restrained, which enhances the vehicle ride.

In addition, referring to the solid curve in FIG. 5A, any jump of the dynamic stiffness which would conventionally be caused (as shown in the broken curve in the figure) does not occur in a wide frequency range from 10 to 30 Hz. Therefore, there is no possibility of having an adverse effect on absorption of engine-idle vibration. Upon input of relatively large-amplitude vibration, a drop in dynamic stiffness as in the broken curve may cause wobbling of the entire power train. In contrast, as seen from reference to the solid curve, the engine mount A does not cause such a drop in dynamic stiffness and, therefore, there is no need to worry about wobbling of the power train.

Figure 6A:
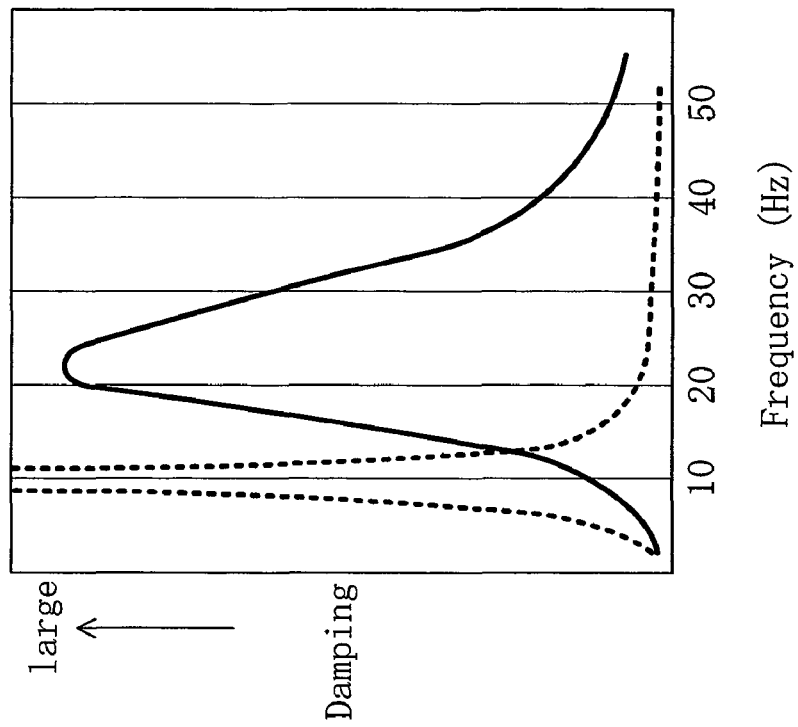
FIG. 6A is a corresponding view of FIG. 5A when the amplitude of input vibration is relatively small.
Figure 6B:
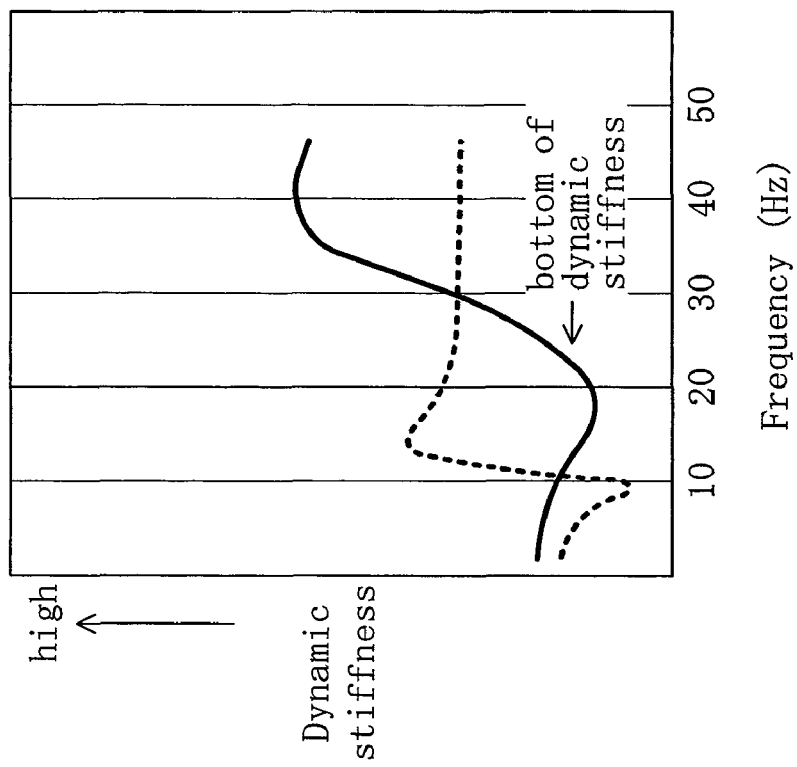
FIG. 6B is a corresponding view of FIG. 5B when the amplitude of input vibration is relatively small.

On the other hand, FIGS. 6A and 6B show characteristics of the engine mount A when vibration of relatively low amplitude (±0.05 mm) corresponding to engine-idle vibration is applied thereto. As shown in FIG. 6A, a bottom of the dynamic stiffness appears over a wide frequency range (15 to 25 Hz in the example in the figure) including the frequency of engine-idle vibration. This shows that the engine mount A of this embodiment can effectively absorb engine-idle vibration and sufficiently restrain transmission of vibration to the vehicle body.

In addition, in the wide frequency range, a very high damping effect is obtained as shown in the solid curve in FIG. 6B. The engine mount A of this embodiment not only can effectively absorb engine-idle vibration as described above but also can suppress it.

Modifications

Figure 7:
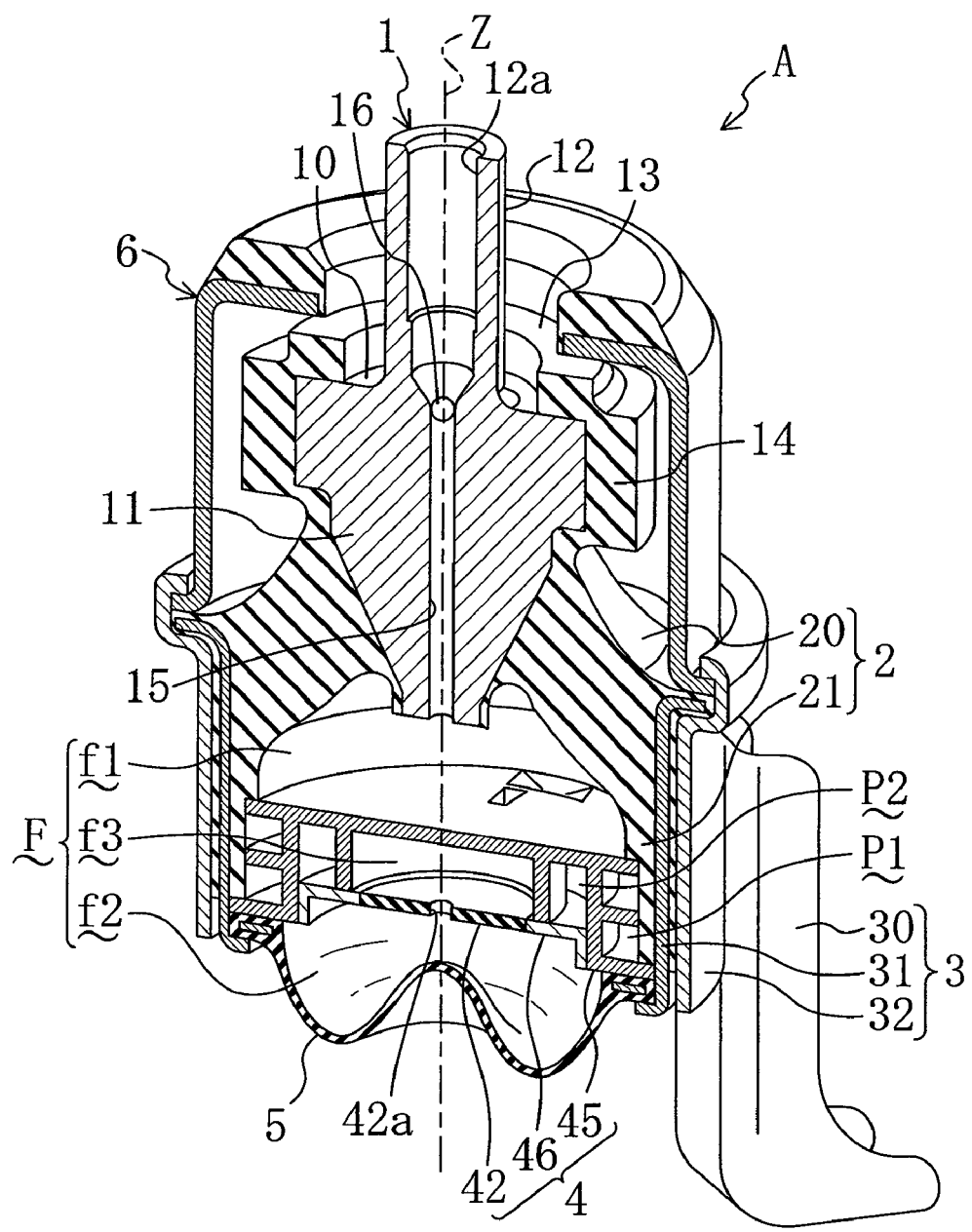
FIG. 7 is a corresponding view of FIG. 1 in Modification 1 of Embodiment 1.
Figure 8:
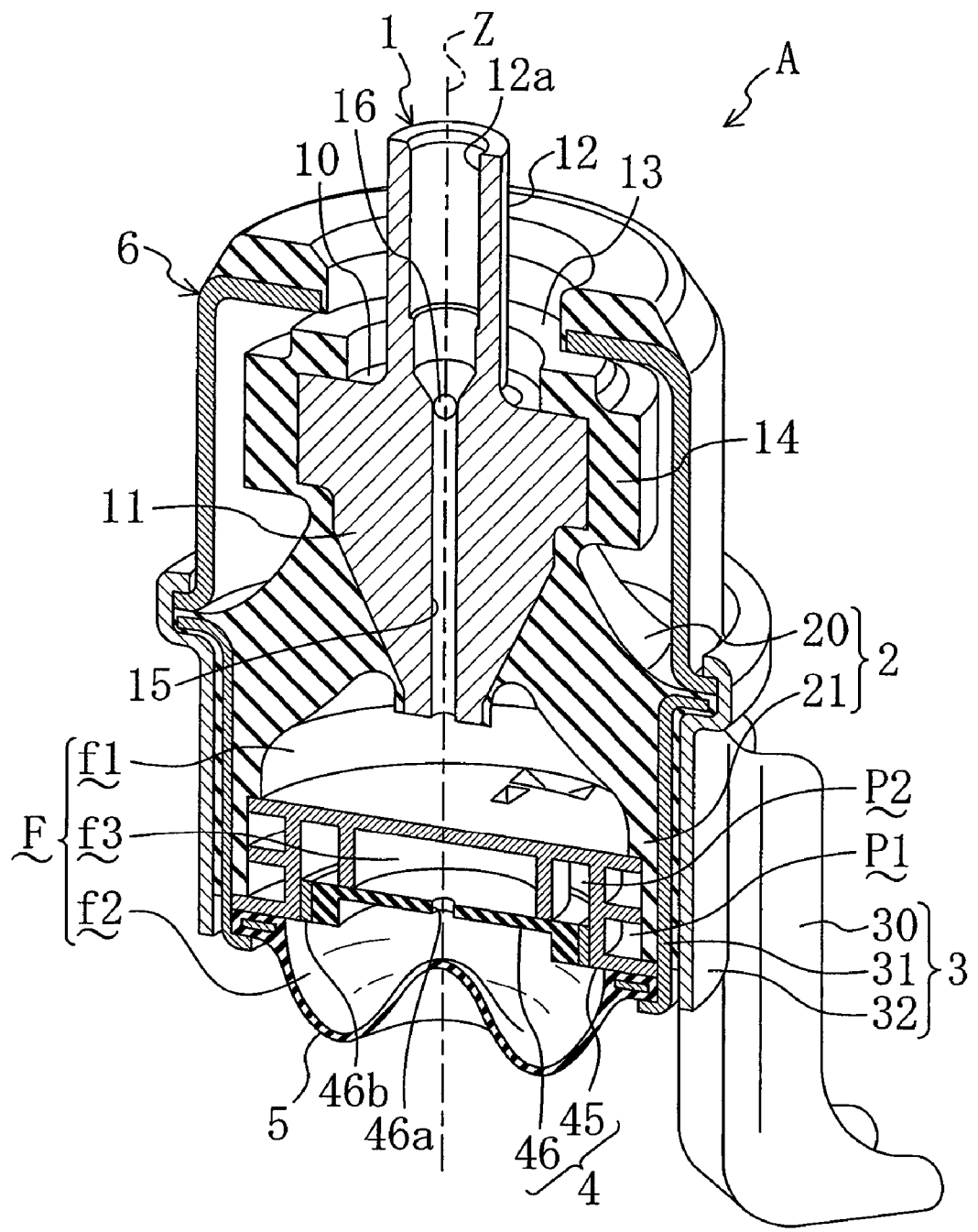
FIG. 8 is a corresponding view of FIG. 1 in Modification 2 of Embodiment 1.
Figure 9:
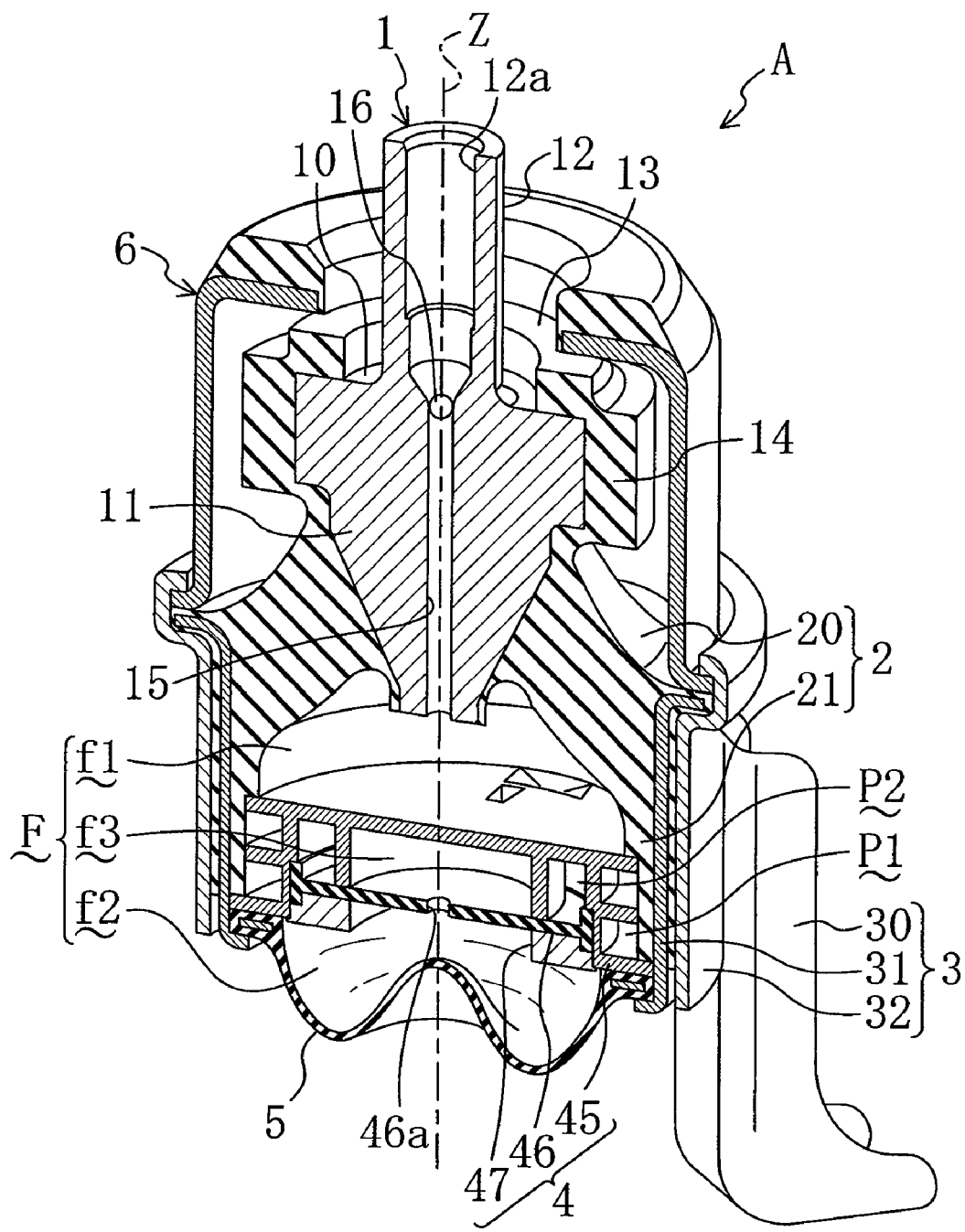
FIG. 9 is a corresponding view of FIG. 1 in Modification 3 of Embodiment 1.

FIGS. 7 to 9 show modifications of Embodiment 1. These engine mounts A according to the modifications are different from the above embodiment only in details of the structure of the orifice disk 4.

First, in Modification 1 shown in FIG. 7, the orifice disk 4 includes an approximately disk-shaped main body 45 and a lid 46 assembled in the main body 45. The main body 45 has such a structure that a combination of the outer member 40 and the inner member 41 without the flange 41c in the above embodiment are integrally formed from, for example, metal (or resin).

The lid 46 has a structure as if the membrane 42 is attached to the flange 41c removed from the inner member 41 to close the opening of the flange 41c. The lid 46 is assembled into the main body 45 from below as shown in FIG. 7, thereby forming the second orifice channel P2 and the intermediate liquid chamber f3. Although in the example of the figure the lid 46 is also formed from metal by casting or the like (or from resin by molding), it may be produced by sheet metal processing.

In Modifications 2 and 3 shown in FIGS. 8 and 9, respectively, the lid 46 is entirely made of rubber, a central portion thereof functions as a membrane and a communicating hole 46a is formed at the center of the lid 46. In the engine mount A shown in FIG. 8, a ring 46b made of metal (or resin) is attached to the outer periphery of the lid 46 and the lid 46 is fitted through the ring 46b into the main body 45. On the other hand, in the engine mount A shown in FIG. 9, a separate engagement member 47 is fitted into the main body 45 after insertion of the lid 46, whereby a portion of the lid 46 near to the outer periphery is clamped between the engagement member 47 and the main body 45.

Embodiment 2 and its Modifications

Next, FIGS. 10 to 13 show engine mounts A according to Embodiment 2 and its Modifications 1 to 3. These engine mounts A are different from Embodiment 1 and its modifications in the structure of the orifice disk 4. In Embodiment 1 and its modifications, the intermediate liquid chamber f3 is disposed on the side of the orifice disk 4 near to the balancing chamber f2 to separate both the chambers f2 and f3 from each other with the membrane 42 or the like as a partition. In contrast, in Embodiment 2 and its modifications, the intermediate liquid chamber f3 is disposed on the side of the orifice disk 4 near to the pressure receiving chamber f1 to separate both the chambers f1 and f3 from each other with the membrane 42 or the like as a partition.

Figure 14:
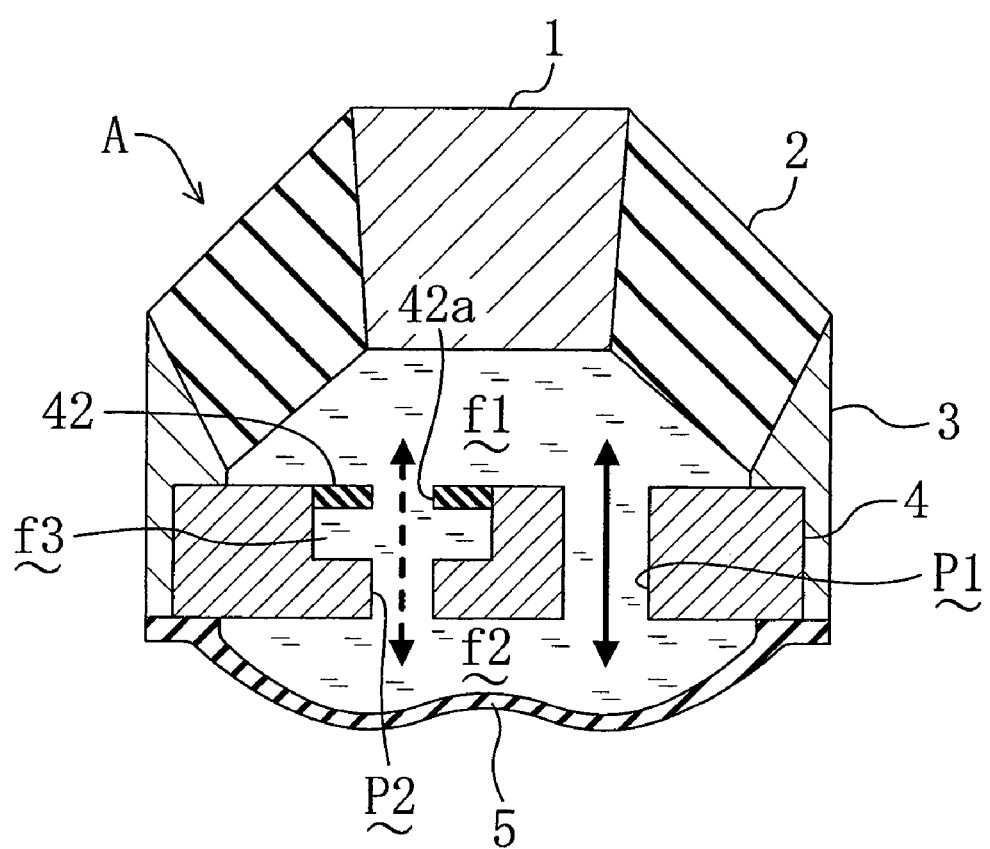
FIG. 14 is a corresponding view of FIG. 3 in Modification 3 of Embodiment 2.

In other words, these engine mounts A shown in FIGS. 10 to 13 have such structures that the orifice disks 4 of the engine mounts A shown in FIGS. 1 and 7 to 9 are provided upside down. In each of these engine mounts A, as schematically shown in FIG. 14, the pressure receiving chamber f1 is communicated via the first orifice channel P1 with the balancing chamber f2, while the balancing chamber f2 is communicated via the second orifice channel P2 with the intermediate liquid chamber f3. Furthermore, a communicating hole 42a is formed in the membrane 42 separating the intermediate liquid chamber f3 and the pressure receiving chamber f1 from each other.

According to the engine mounts A of Embodiment 2 and its modifications having the above structures, like Embodiment 1 and its modifications described above with reference to FIGS. 3 and 4, the states of liquid flowing through the first and second orifice channels P1 and P2 change according to the frequency of input vibration. Furthermore, the interaction between the first and second orifice channels P1 and P2 provides a sufficient vibration damping effect over a wide frequency range covering from so-called engine shake to engine-idle vibration.

Note that since the communicating hole 42a, 46a is formed in the membrane 42, 46 facing the pressure receiving chamber f1, when large-amplitude vibration is input to the engine mount A to significantly vary the liquid pressure in the pressure receiving chamber f1 over a predetermined value, the liquid flowing via the communicating hole 42a, 46a into the pressure receiving chamber f1 may cause a strong turbulence and, particularly, air bubbles in the vicinity of the communicating hole 42a, 46a (cavitation). Therefore, it can be believed that the structures of the engine mounts A of Embodiment 1 and its modifications are more preferable.

Embodiment 3

Figure 15:
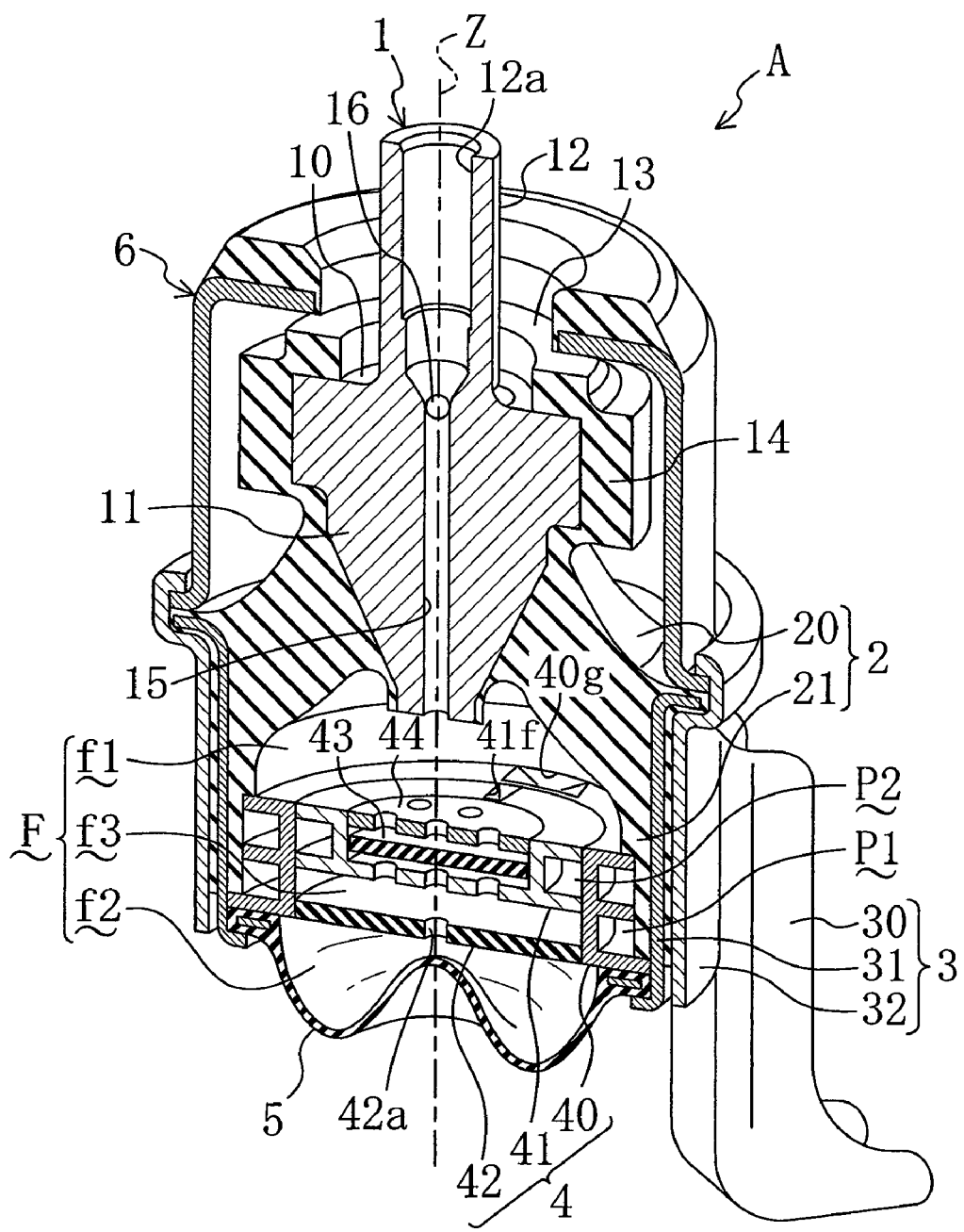
FIG. 15 is a corresponding view of FIG. 1 in Embodiment 3.

Next, FIG. 15 shows an engine mount A according to Embodiment 3. This mount A is also different from Embodiments 1 and 2 and their modifications in the structure of the orifice disk 4. Specifically, the orifice disk 4 of the engine mount A of Embodiment 3 is basically the same as in Embodiment 1, in which the intermediate liquid chamber f3 is disposed near to the balancing chamber f2 and both the chambers f2 and f3 are separated from each other by the membrane 42. However, the orifice disk 4 in this embodiment includes a movable plate 43 disposed in a partition wall between the intermediate liquid chamber f3 and the pressure receiving chamber f1.

To be more specific, as shown in enlarged view in FIG. 16, the orifice disk 4 in this embodiment has a structure in which, in the same manner as in Embodiment 1, the inner member 41 is fitted in the inner periphery of the outer member 40 from above to form a recess opening towards the balancing chamber f2 located below and the lower end opening of the recess is covered with the membrane 42 to form the intermediate liquid chamber f3.

The engine mount A of Embodiment 3 is different from that of Embodiment 1 in details of the structure of the inner member 41. The inner member 41 in Embodiment 3 has a structure in which the inner member 41 in Embodiment 1 is vertically inverted to put the top plate 41a into a position of a bottom plate (in this embodiment, hereinafter referred to as a bottom plate 41a) and the lid 44 is attached to the top end of the cylindrical wall 41b rising from the top surface of the bottom plate 41a to form an accommodation space for the movable plate 43 within the cylindrical wall 41b.

Figure 16:
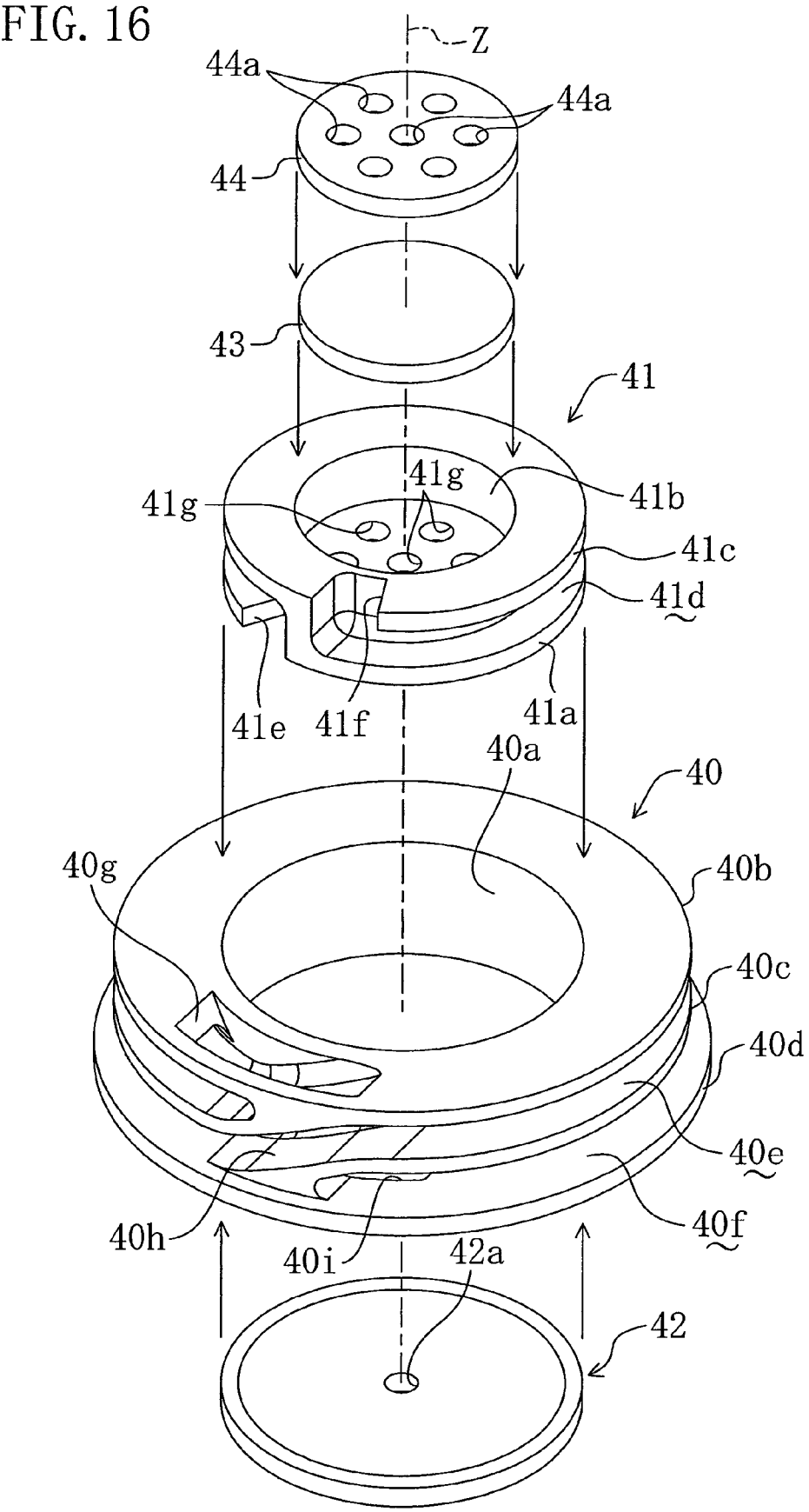
FIG. 16 is a corresponding view of FIG. 2 in Embodiment 3.

Furthermore, a plurality of through holes 41g, 41g, . . . , as indicated by reference numerals only in FIG. 16, are formed through the thickness of the bottom plate 41a in a portion of the bottom plate 41a located near to the center and constituting the floor of the accommodation space. Likewise, a plurality of through holes 44a, 44a, . . . are formed in the lid 44 constituting the ceiling of the accommodation space. The liquid pressures in the pressure receiving chamber f1 and the intermediate liquid chamber f3 act through the through holes 41g, . . . and 44a, . . . on the accommodation space for the movable plate 43. The movable plate 43 moves up and down according to changes in the liquid pressures.

Note that since the inner member 41 is vertically inverted in the above manner, the upper end of the second orifice channel P2 opening to the pressure receiving chamber f1 is the cutaway 41f in the inner member 41 as shown in FIG. 15.

Figure 17:
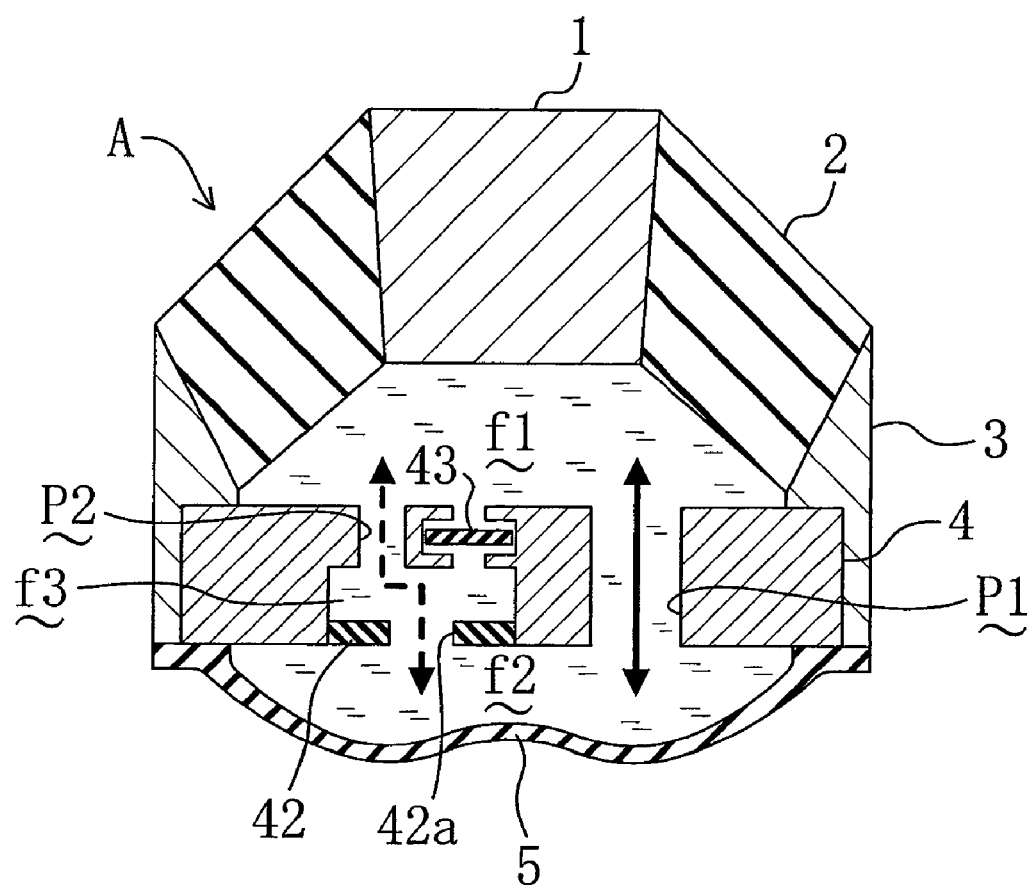
FIG. 17 is a corresponding view of FIG. 3 in Embodiment 3.

The engine mount A of Embodiment 3 including the orifice disk 4 having the above structure is as schematically shown in FIG. 17. Like Embodiments 1 and 2 and their modifications, the engine mount A of Embodiment 3 provides a sufficient vibration damping effect over a wide frequency range by the interaction between the first and second orifice channels P1 and P2.

In addition, in Embodiment 3, when relatively small-amplitude vibration, such as engine-idle vibration, is input to the engine mount A, variations in liquid pressures in the pressure receiving chamber f1 and the intermediate liquid chamber f3 can be absorbed by movement of the movable plate 43, thereby eliminating a so-called jump of the dynamic stiffness. However, in order to ensure sufficient damping effects of the orifice channels P1 and P2, the movable plate 43 cannot have a very large amount of movement. Therefore, when the amplitude of input vibration is large, the effect of the movable plate 43 is limited.

Figure 18A:
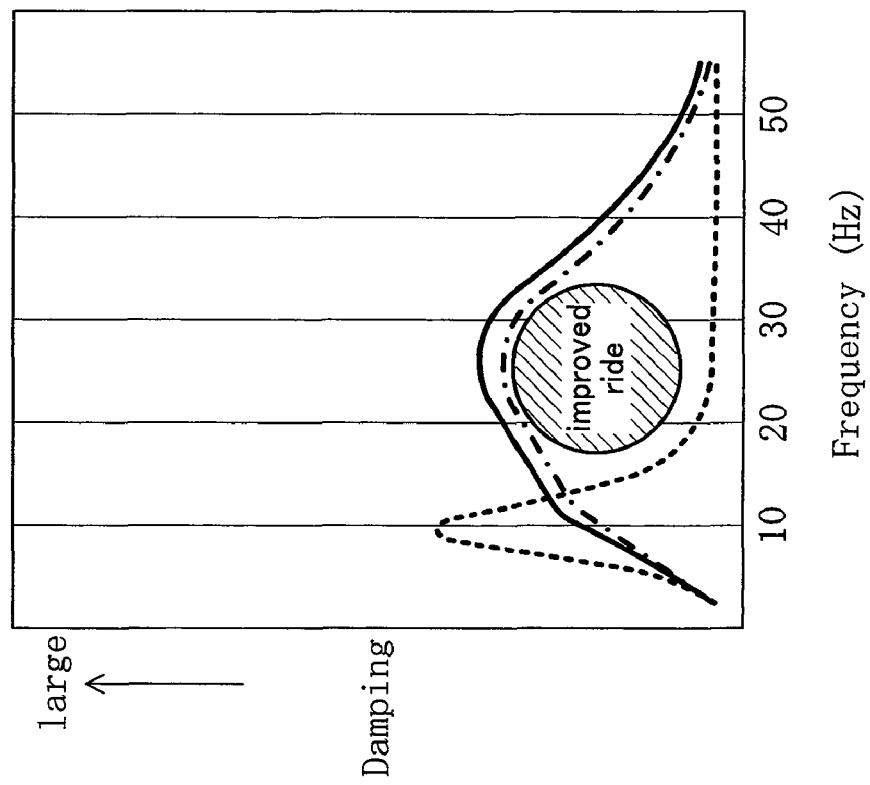
FIG. 18A is a corresponding view of FIG. 5A in Embodiment 3.
Figure 18B:
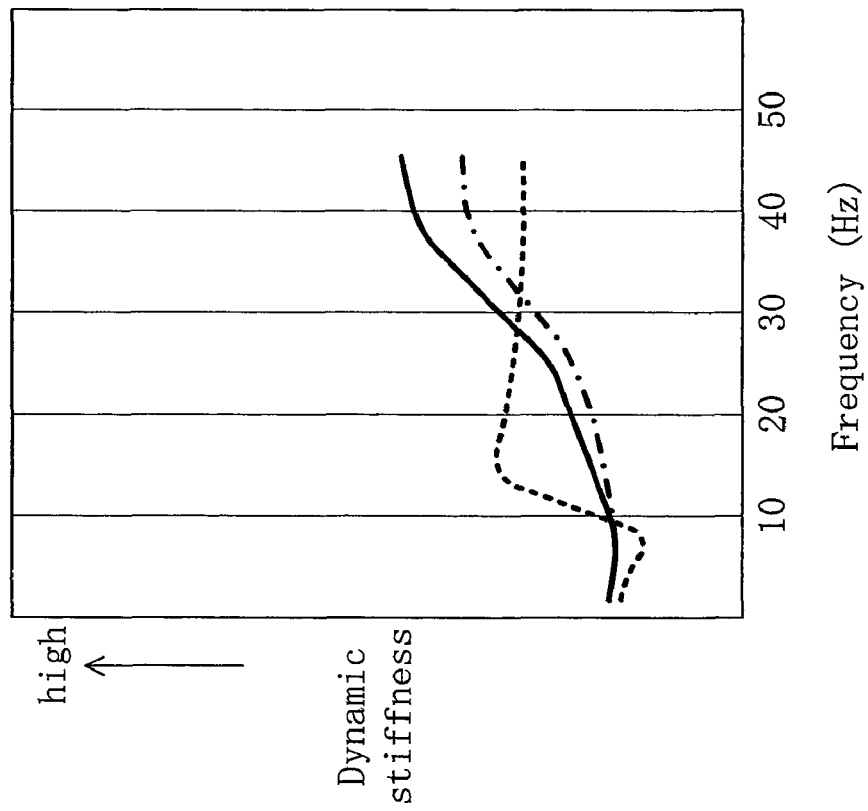
FIG. 18B is a corresponding view of FIG. 5B in Embodiment 3.
Figure 19A:
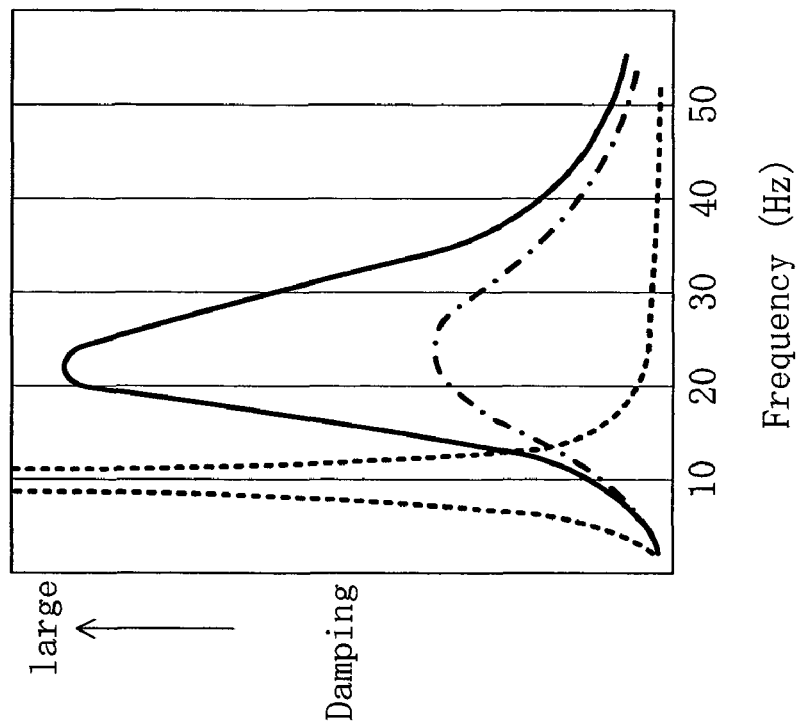
FIG. 19A is a corresponding view of FIG. 6A in Embodiment 3.

FIGS. 18 and 19 show, in addition to the previously described graphs of FIGS. 5 and 6, the dynamic stiffness and damping characteristics of the engine mount A including a movable plate 43 in Embodiment 3. When relatively small-amplitude vibration, such as engine-idle vibration, is applied to the engine mount A, the vibration is absorbed by movement of the movable plate 43, whereby the mount A exhibits a low and flat dynamic stiffness characteristic from low to high frequencies as shown in the dot-dash curve in FIG. 19A.

Furthermore, even at a relatively large amplitude, variations in liquid pressures are absorbed by movement of the movable plate 43, whereby the engine mount A exhibits, as shown in the dot-dash curve in FIG. 18A, a gentler rising dynamic stiffness characteristic than those in Embodiments 1 and 2 and their modifications (the solid curve).

Figure 19B:
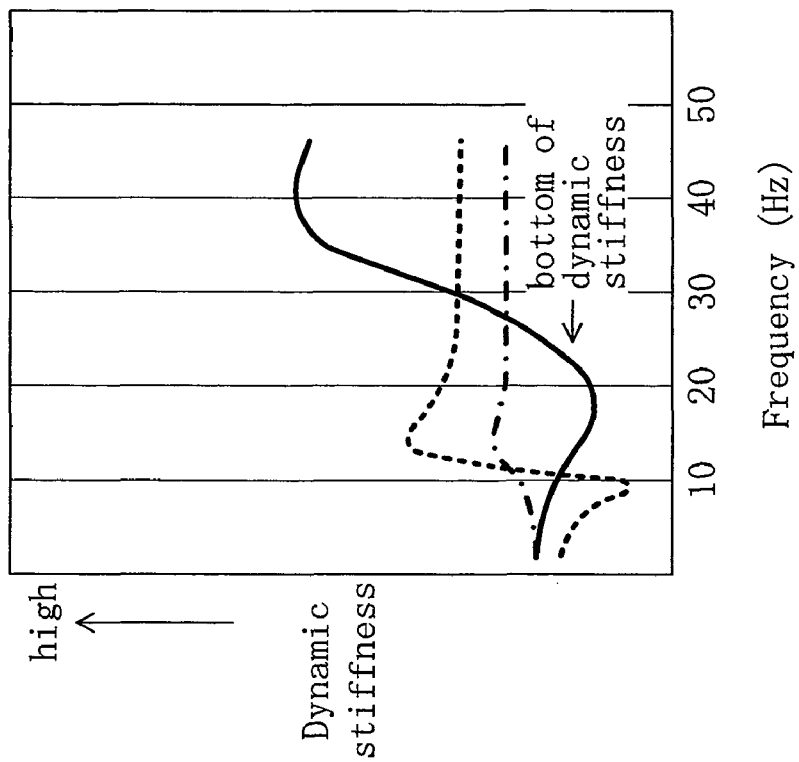
FIG. 19B is a corresponding view of FIG. 6B in Embodiment 3.

Note that, as shown in the dot-dash curves in FIGS. 18B and 19B, the vibration damping effects of the orifice channels P1 and P2 may be slightly lowered by the addition of the movable plate 43 but are much higher than those in the conventional example (shown in the broken curves).

Modifications

Figure 20:
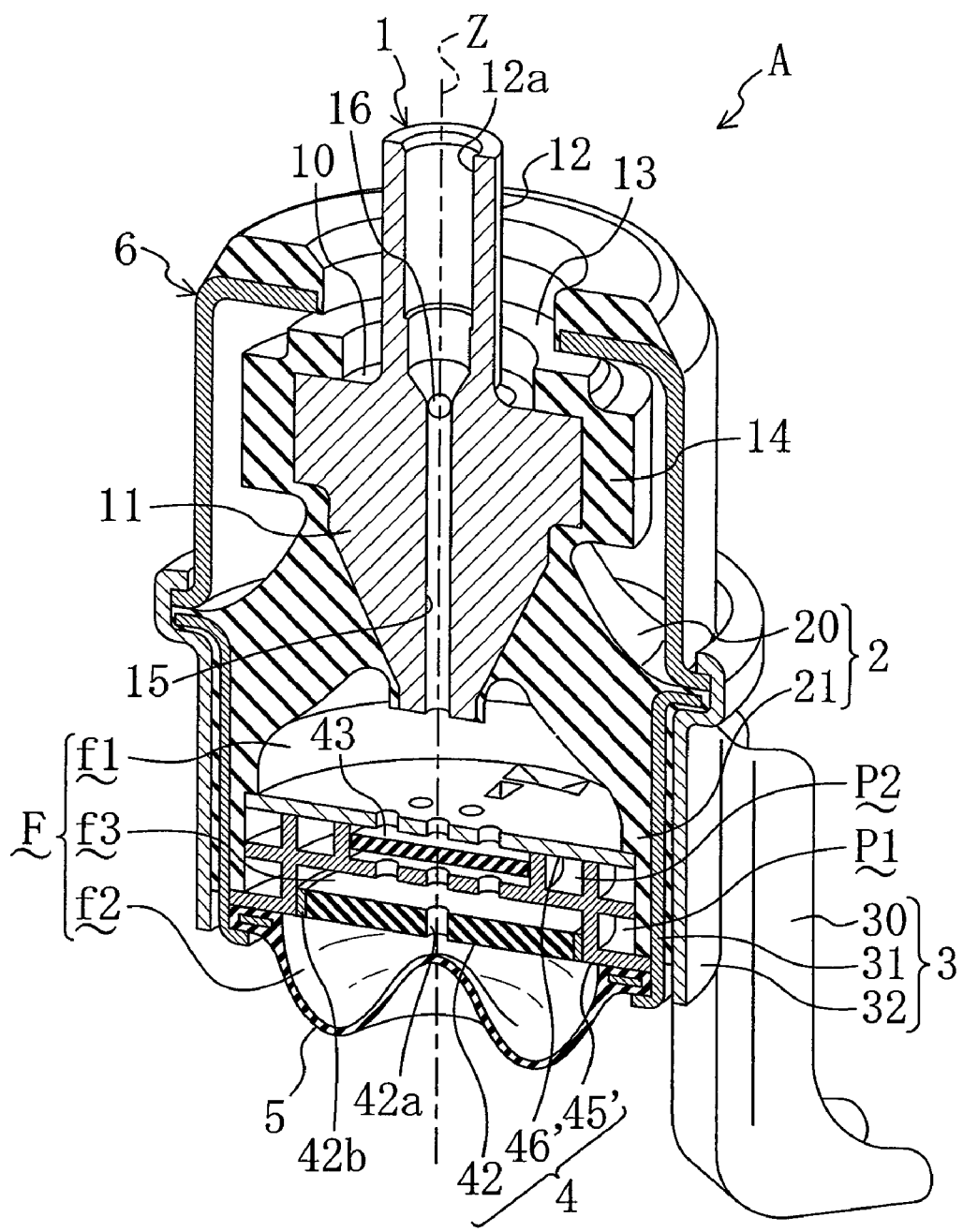
FIG. 20 is a corresponding view of FIG. 1 in Modification 1 of Embodiment 3.
Figure 21:
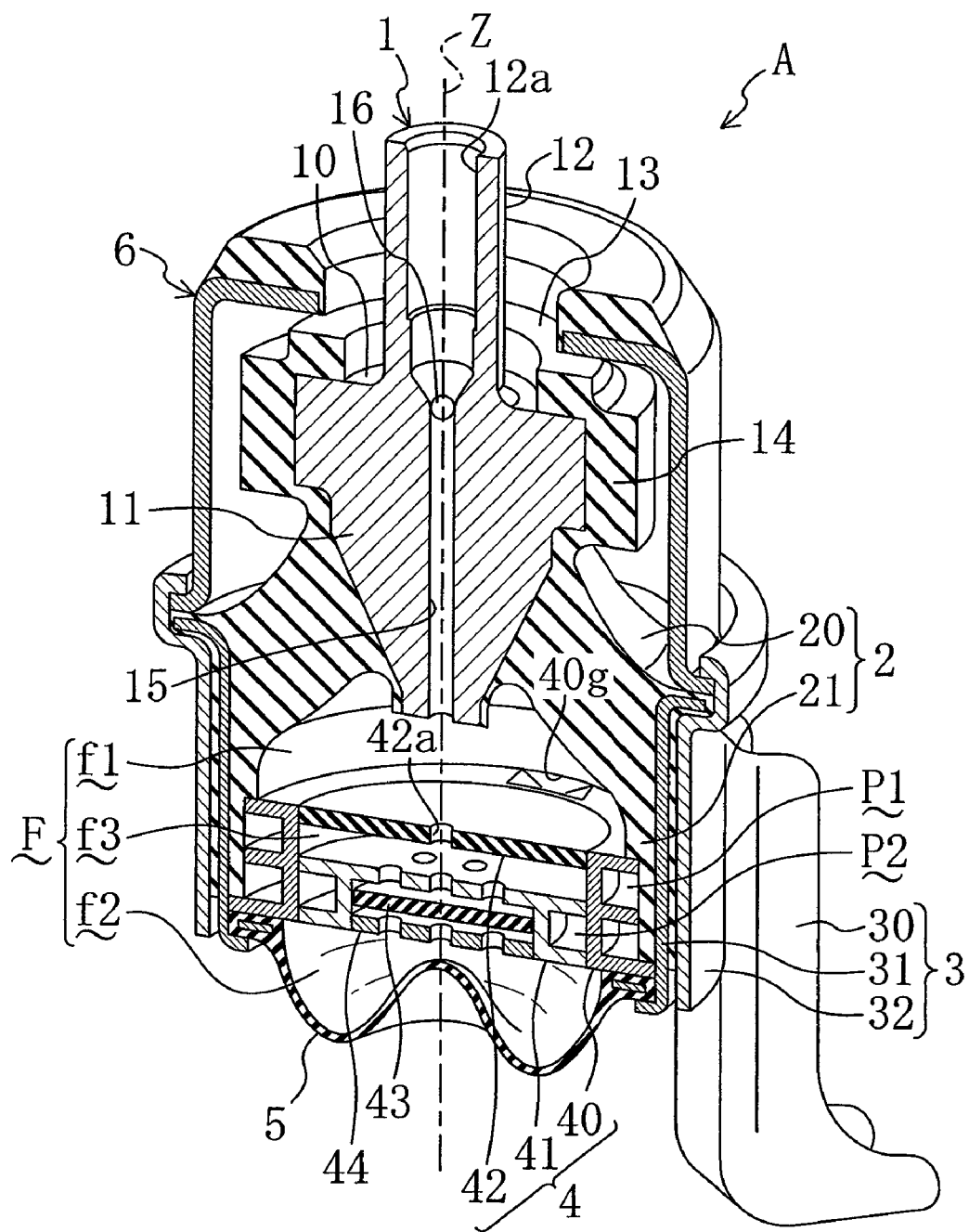
FIG. 21 is a corresponding view of FIG. 1 in Modification 2 of Embodiment 3.

FIGS. 20 and 21 show different modifications of Embodiment 3. In Modification shown in FIG. 20, the orifice disk 4 includes an approximately disk-shaped main body 45' and a circular top plate member 46' assembled in the main body 45'. The main body 45' has such a structure that a combination of the outer member 40 without the flange 40b and the inner member 41 without the flange 41d in Embodiment 3 are integrally formed from, for example, metal (or resin).

On the other hand, the top plate member 46' has a structure as if the lid 44 is attached to the flanges 40b and 41d removed from the outer and inner members 40 and 41 and they are integrally formed from, for example, metal (or resin). The top plate member 46' is assembled into the main body 45' from above as shown in FIG. 20, thereby forming the first and second orifice channels P1 and P2 and the accommodation space for the movable plate 43.

The top plate member 46' may be formed, such as by die casting, or may by produced by sheet metal processing. Although in the example of FIG. 20 a ring 42b made of metal (or resin) is attached to the outer periphery of the membrane 42 and fitted in the main body 45', the joint between the main body 45' and the membrane 42 is not limited to this. For example, as in Embodiment 3, the membrane 42 may be attached to the main body 45', such as by adhesion. An engine mount A shown in FIG. 21 is a modification from Embodiment 3 corresponding to the engine mount A of Embodiment 2 shown in FIG. 10.

Embodiment 4 and its Modifications

Lastly, FIGS. 22 to 24 are longitudinal cross-sectional views of engine mounts A' according to Embodiment 4 and its Modifications 1 to 7. These engine mounts A' have their respective general structures in which the engine mounts A of Embodiments 1 to 3 and their modifications are inverted. Therefore, elements and parts having the same functions, even if having different shapes, are designated by the same reference numerals and will not be described further.

Figure 22A:
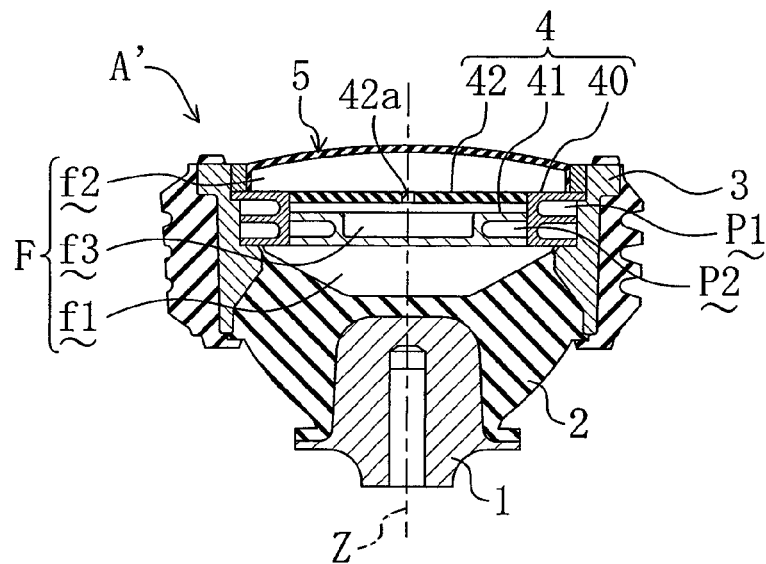
FIG. 22A is a cross-sectional view of the structure of an engine mount according to Embodiment 4.

The engine mounts A' shown in FIGS. 22 and 23 correspond to the engine mounts A of Embodiments 1 and 2, respectively. Specifically, in the engine mount A' shown in FIG. 22A, the inner fitting 1 is located on the vehicle body side (connected to a supporting part), the die-cast outer fitting 3 is located on the power train side (connected to a supported part), and the main spring part 20 of the rubber elastic material 2 connecting the inner and outer fittings 1 and 3 has a cone shape whose diameter gradually expands upward. Furthermore, the orifice disk 4 and the diaphragm 5 are assembled in the main spring part 20 from above to define the liquid chamber F, i.e., a lower pressure receiving chamber f1 and an upper balancing chamber f2, respectively.

Figure 10:
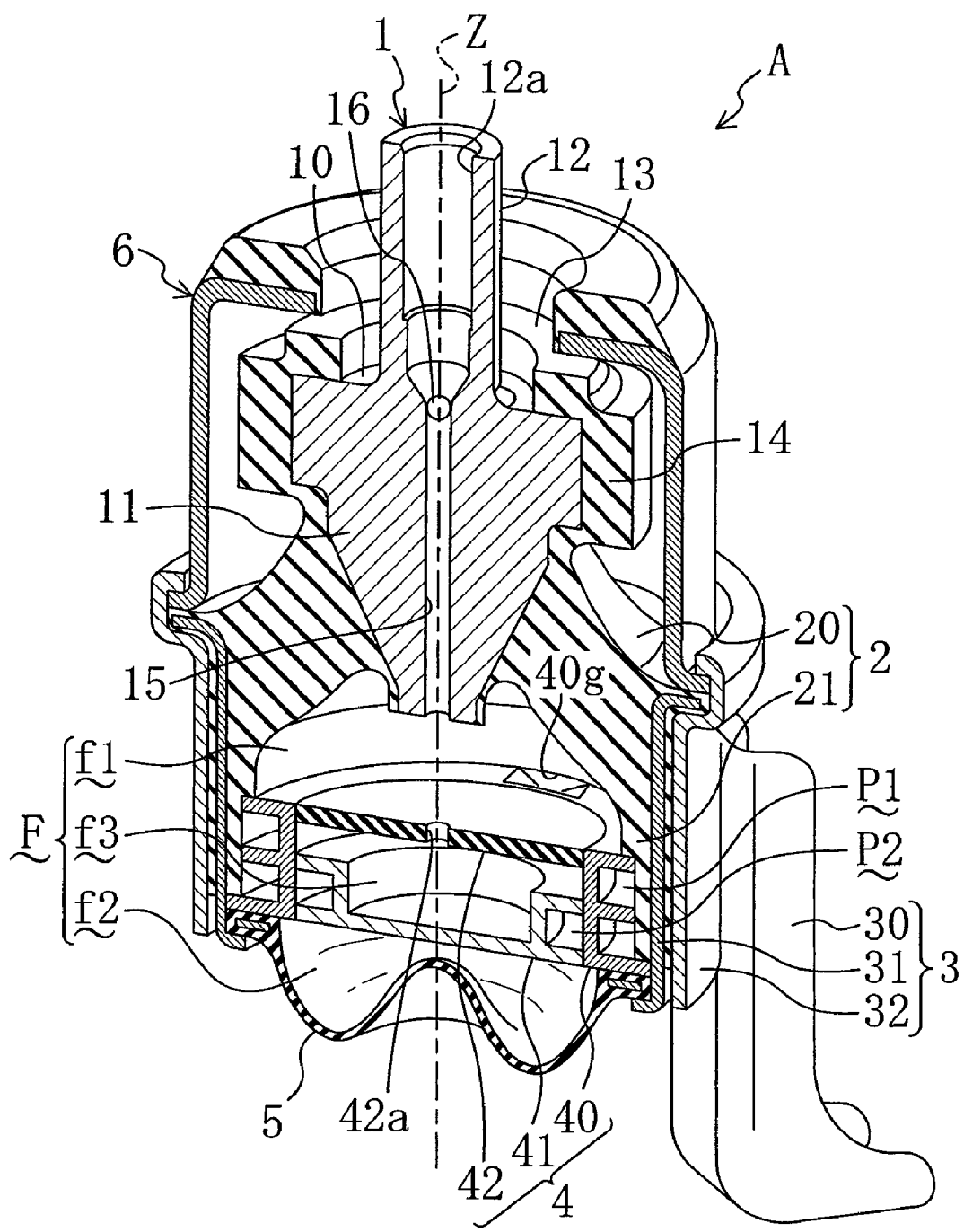
FIG. 10 is a corresponding view of FIG. 1 in Embodiment 2.
Figure 11:
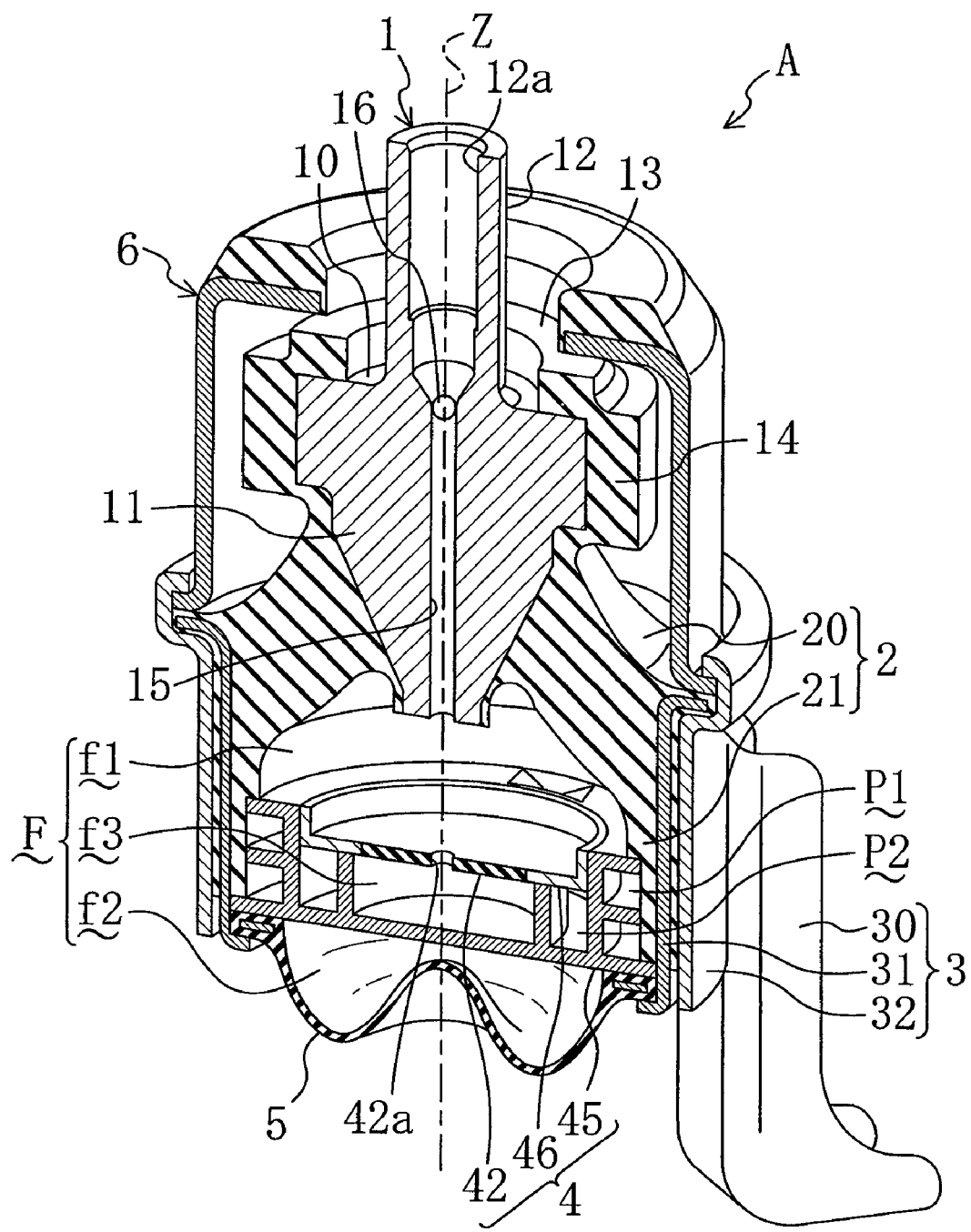
FIG. 11 is a corresponding view of FIG. 1 in Modification 1 of Embodiment 2.
Figure 12:
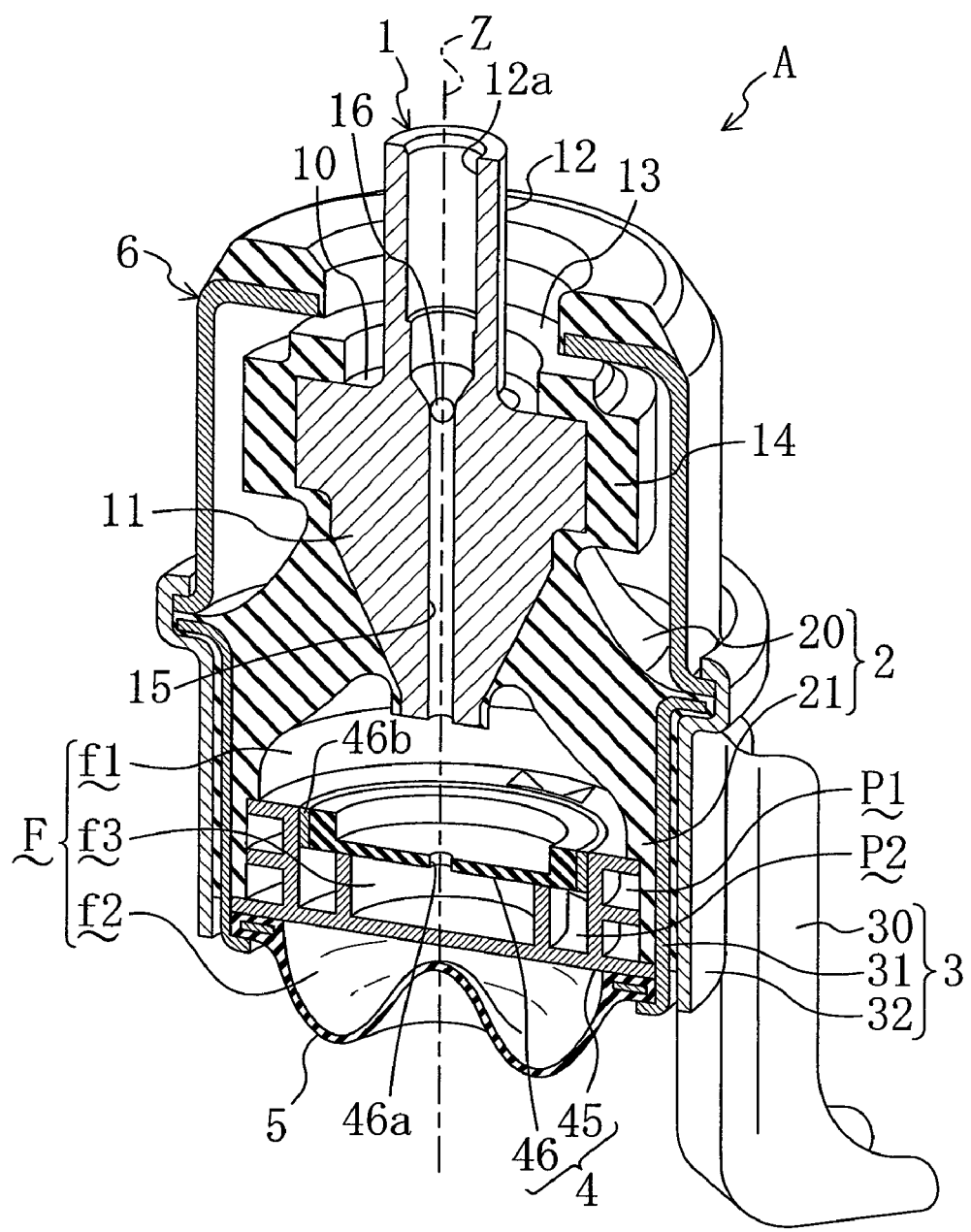
FIG. 12 is a corresponding view of FIG. 1 in Modification 2 of Embodiment 2.
Figure 13:
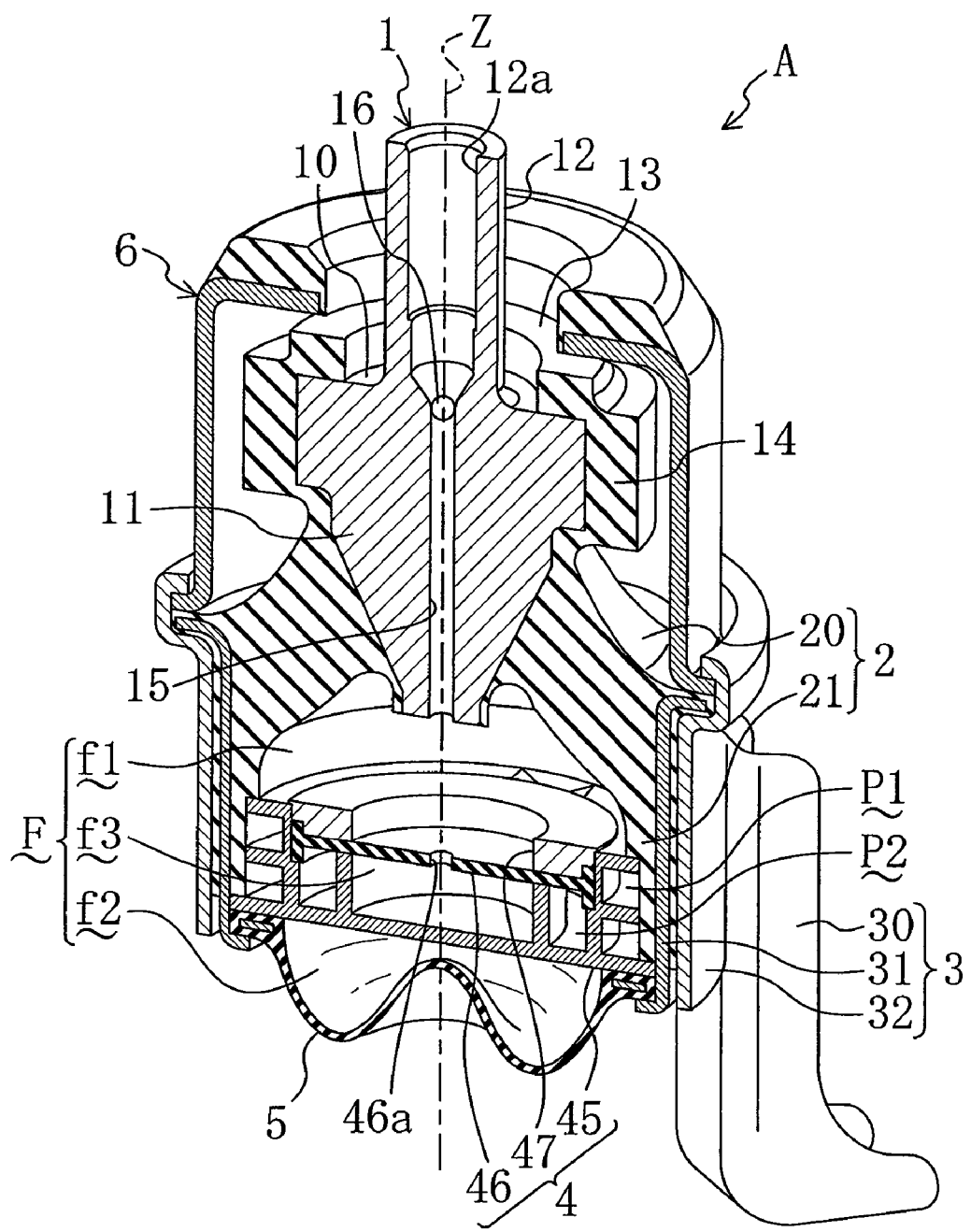
FIG. 13 is a corresponding view of FIG. 1 in Modification 3 of Embodiment 2.

The orifice disk 4 is, like those in FIGS. 1 and 10, composed of an outer member 40, an inner member 41 and a membrane 42. Formed in the outer periphery of the orifice disk 4 is a first orifice channel P1 of vertical two-story structure. Formed inward of the first orifice channel P1 are a circular intermediate liquid chamber f3 and an annular second orifice channel P2 surrounding the intermediate liquid chamber f3.

The first orifice channel P1 provides communication between the pressure receiving chamber f1 and the balancing chamber f2, while the second orifice channel P2 provides communication between the pressure receiving chamber f1 and the intermediate liquid chamber f3. The membrane 42 between the balancing chamber f2 and the intermediate liquid chamber f3 has a communicating hole 42a formed therein to substantially communicate the balancing chamber f2 and the intermediate liquid chamber f3 with each other upon input of low-frequency vibration.

Figure 22B:
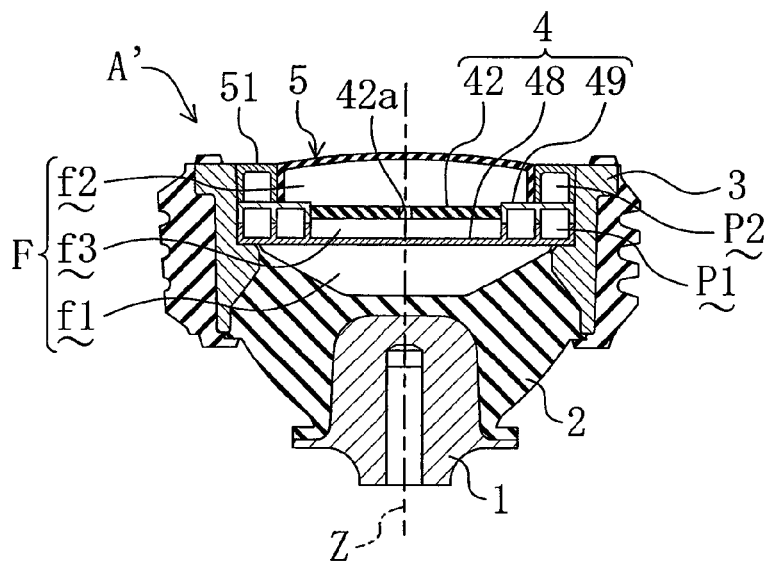
FIG. 22B is a corresponding view of FIG. 22A in Modification 1 of Embodiment 4.
Figure 23A:
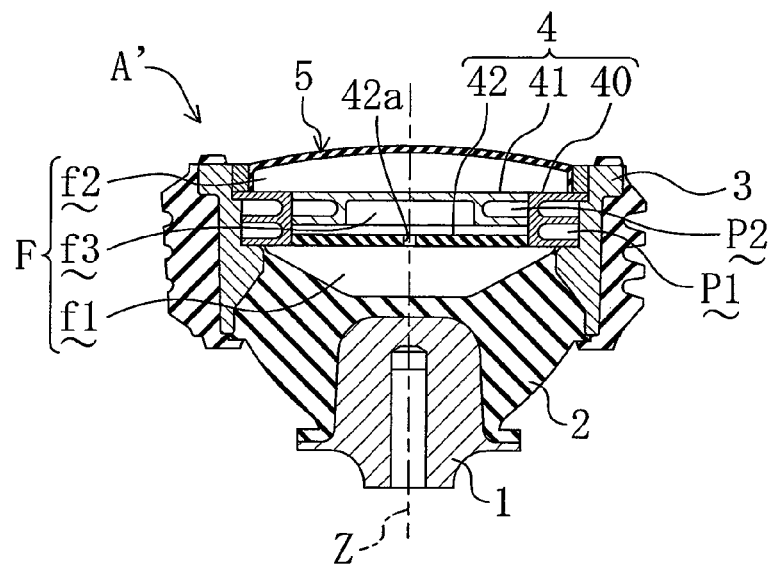
FIG. 23A is a corresponding view of FIG. 22A in Modification 3 of Embodiment 4.
Figure 23B:
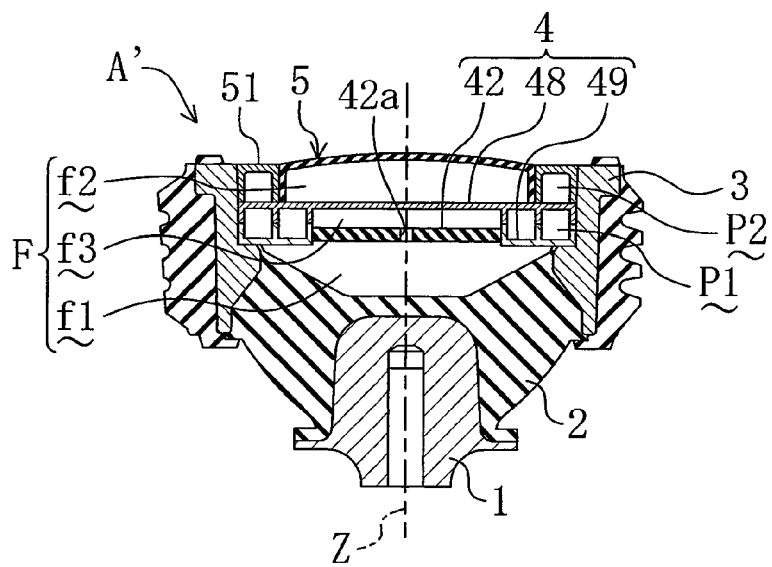
FIG. 23B is a corresponding view of FIG. 22A in Modification 4 of Embodiment 4.

On the other hand, in the modifications shown in FIGS. 22B and 23B, the orifice disk 4 is composed of a disk-shaped main body 48 and an annular member 49 assembled with the main body 48. The orifice disk 4 has a first orifice channel P1 of inner and outer double structure formed therein. The membrane 42 defines the intermediate liquid chamber f3. A ring 51 made of metal (or resin) is attached to the outer periphery of the diaphragm 5 and fitted in the outer fitting 3. A second orifice channel P2 is formed in the ring 51.

Figure 22C:
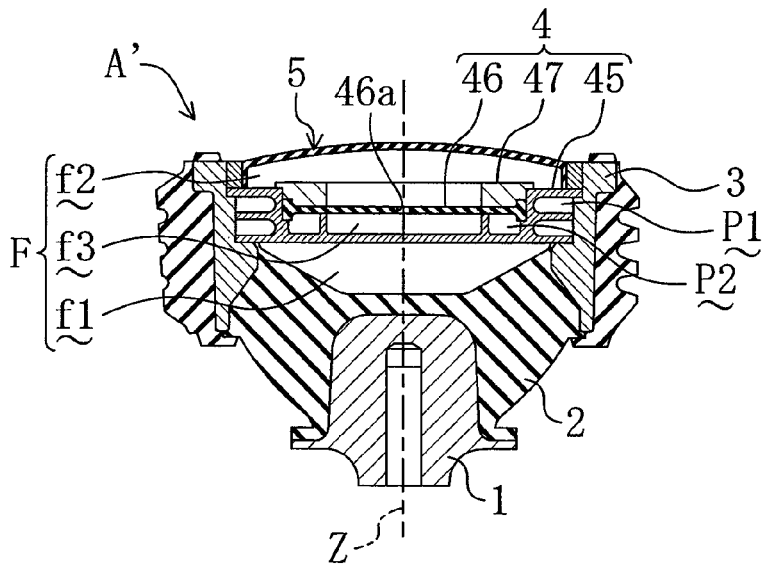
FIG. 22C is a corresponding view of FIG. 22A in Modification 2 of Embodiment 4.
Figure 23C:
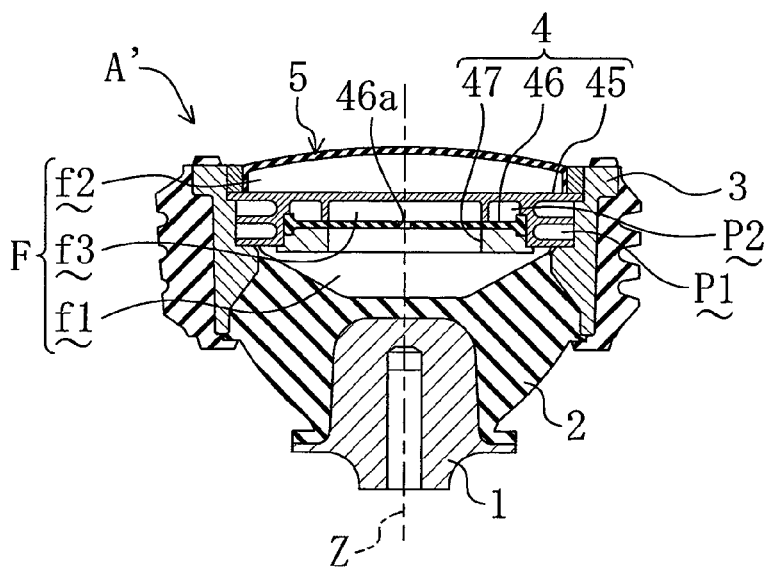
FIG. 23C is a corresponding view of FIG. 22A in Modification 5 of Embodiment 4.
Figure 24A:
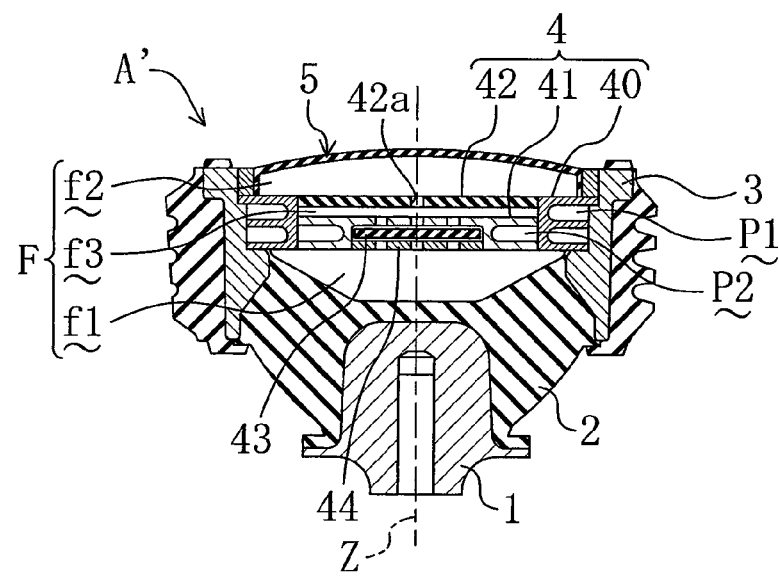
FIG. 24A is a corresponding view of FIG. 22A in Modification 6 of Embodiment 4.
Figure 24B:
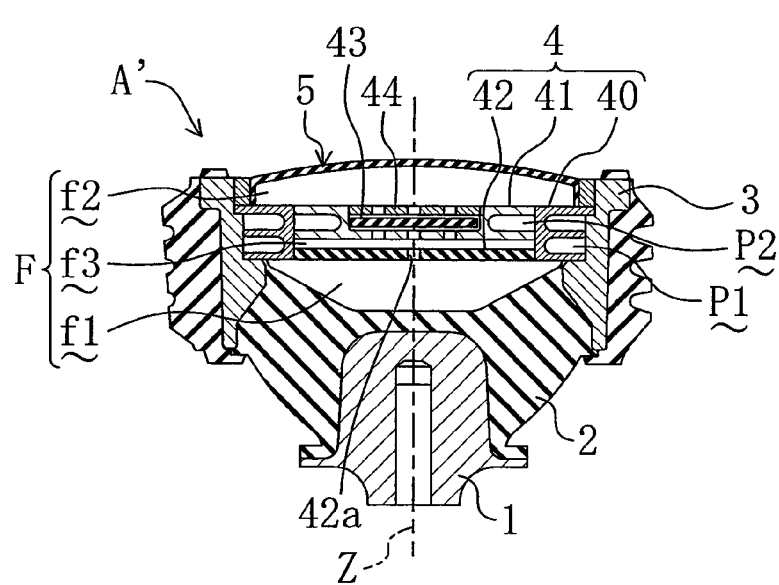
FIG. 24B is a corresponding view of FIG. 22A in Modification 7 of Embodiment 4.

The modifications shown in FIGS. 22C and 23C uses orifice disks 4 having the same structure as that shown in FIG. 9. FIGS. 24A and 24B show modifications including respective movable plates 43 in addition to the structures shown in FIGS. 22A and 23A, respectively.

Other Embodiments

The structure of the vibration isolator according to the present invention is not limited to those of Embodiments 1 to 4 and their modifications and includes various other structures. For example, although in the above embodiments and modifications the second orifice channel P2 is formed to have a relatively short distance as compared to the first orifice channel P1, the present invention is not limited to this and the second orifice channel P2 may be formed to have a relatively large cross-sectional area. In other words, it is sufficient if the second orifice channel P2 is tuned to higher frequencies than the first orifice channel P1.

Since, as described previously, the size of the communicating hole 42a, 46a formed in the membrane 42 or the lid 46 is an important factor affecting the characteristics of the mount A, A', it should be selected not only in consideration of the size, thickness, rubber hardness and the like of the membrane 42 or lid 46 but also based on experiments or the like according to the desired characteristics of the mount A, A'. For example, if the thickness of the membrane 42 or lid 46 is approximately 1.0 to 5.0 mm, it can be considered preferable to select the diameter of the communicating hole 42a, 46a within the range from approximately 2.0 to 10.0 mm and more preferable to select it within the range from approximately 3.0 to 6.0 mm according to the example of FIG. 4. The communicating hole 42a, 46a may not necessarily be formed at the center of the membrane 42 or lid 46.

Although in the above embodiments and modifications the pressure receiving chamber f1 and the balancing chamber f2 are separated from each other by the orifice disk 4 and the intermediate liquid chamber f3 is formed in the orifice disk 4, the present invention is not limited to this structure. For example, the orifice channels P1 and P2 and the intermediate liquid chamber f3 may be provided separately from a partition member separating the pressure receiving chamber f1 and the balancing chamber f2 from each other.

Although in the above embodiments and modifications the vibration isolator of the present invention is applied to a so-called longitudinal engine mount A, A', it can be applied not only to longitudinal engine mounts but also to transverse engine mounts. Furthermore, the vibration isolator can be applied not only to engine mounts but also to suspension bushes and the like for motor vehicles and to vibration isolators for use in other than motor vehicles.

What is claimed is:

1. A liquid-filled vibration isolator including a first fitting connected to a supported part, a second fitting connected to a supporting part and through a rubber elastic material to the first fitting, a main liquid chamber formed between both the first and second fittings to change the volume thereof with deformation of the rubber elastic material, and a first sub liquid chamber communicated via a first orifice channel with the main liquid chamber, the vibration isolator comprising:
    a second sub liquid chamber communicated via a second orifice channel with one of the main liquid chamber and the first sub liquid chamber, the second orifice channel having at least one of a shorter distance and a larger cross-sectional area than the first orifice channel; and
    an elastic film member separating the second sub liquid chamber from the other of the main liquid chamber and the first sub liquid chamber, the elastic film member having a communicating hole of a predetermined size formed to provide communication between the other chamber and the second sub liquid chamber.

2. The liquid-filled vibration isolator of claim 1, further comprising a movable plate disposed in a partition wall between the one liquid chamber and the second sub liquid chamber, the movable plate being configured to move according to the liquid pressures in both the one liquid chamber and the second sub liquid chamber and absorb variations in the liquid pressures.

3. The liquid-filled vibration isolator of claim 1, wherein
    the second orifice channel provides communication between the main liquid chamber and the second sub liquid chamber, and
    the elastic film member separates the first and second sub liquid chambers from each other.

4. The liquid-filled vibration isolator of claim 1, wherein
    the second orifice channel provides communication between the first and second sub liquid chambers, and
    the elastic film member separates the main liquid chamber and the second sub liquid chamber from each other.

5. The liquid-filled vibration isolator of claim 1, further comprising a partition member separating the main liquid chamber from the first sub liquid chamber, wherein the partition member has the first and second orifice channels and a recess opening to the first sub liquid chamber and the opening of the recess is covered with the elastic film member to form the second sub liquid chamber.

6. The liquid-filled vibration isolator of claim 5, wherein
    one of the first and second fittings has a columnar shape extending in a direction of input of main load,
    the other fitting has a cylindrical shape spaced outwardly away from the one fitting,
    the partition member is fitted in the inner periphery of the other fitting to separate the main liquid chamber and the first sub liquid chamber from each other on opposite sides of the partition member in the direction of input of main load, and
    the communicating hole is formed approximately at the center of the elastic film member covering the opening of the recess in the partition member.

7. The liquid-filled vibration isolator of claim 1, wherein the elastic film member has a thickness of approximately 1.0 to 5.0 mm and the communicating hole has a diameter of approximately 2.0 to 10.0 mm.

* * * * *